US005408330A

United States Patent [19]
Squicciarini et al.

[11] Patent Number: 5,408,330
[45] Date of Patent: Apr. 18, 1995

[54] VIDEO INCIDENT CAPTURE SYSTEM

[75] Inventors: John Squicciarini, Rochester Hills; Itzhak Elrom, Southfield, both of Mich.

[73] Assignee: CrimTec Corporation, Auburn Hills, Mich.

[21] Appl. No.: 675,637

[22] Filed: Mar. 25, 1991

[51] Int. Cl.⁶ .............................................. H04N 5/76
[52] U.S. Cl. .................................. 358/335; 358/341; 358/343
[58] Field of Search ............... 358/310, 335, 311, 108, 358/906; 369/58; 342/140; 346/33 D, 107 VP

[56] References Cited

U.S. PATENT DOCUMENTS

| | | |
|---|---|---|
| 2,148,119 | 2/1939 | Grist . |
| 3,868,478 | 2/1975 | Zeenkov . |
| 4,709,265 | 11/1987 | Silverman et al. . |
| 4,717,915 | 1/1988 | Goede ................. 342/66 |
| 4,734,725 | 3/1988 | Bierman . |
| 4,740,839 | 4/1988 | Phillips . |
| 4,789,904 | 12/1988 | Peterson . |
| 4,843,463 | 6/1989 | Michetti . |
| 4,847,772 | 7/1989 | Michalopoulos et al. . |
| 4,857,912 | 8/1989 | Everett, Jr. et al. . |
| 4,866,438 | 9/1989 | Knisch ................. 340/936 |
| 4,887,080 | 12/1989 | Gross ................. 340/937 |
| 4,893,202 | 1/1990 | Smith . |
| 4,928,174 | 5/1990 | Smith . |
| 4,949,186 | 8/1990 | Peterson ................. 358/335 |
| 4,982,074 | 1/1991 | Ogasawara ................. 235/454 |
| 5,121,200 | 6/1992 | Choi ................. 358/103 |
| 5,132,954 | 7/1992 | Kulakowski et al. ................. 369/48 |

*Primary Examiner*—Tommy P. Chin
*Assistant Examiner*—Robert Chevalier
*Attorney, Agent, or Firm*—Dinnin & Dunn

[57] ABSTRACT

A video incident capture system for law enforcement vehicles. The video incident capture system incorporates a video camera, a video recorder, a radar unit, a real time clock, a monitor, a portable wireless microphone and its associated receiver and a system controller integrating the control of the various components to produce a comprehensive, unedited record of the incident. The system controller superimposes the target speed and patrol speed data generated by the radar unit over the video signals generated by the video camera prior to being recorded on the videotape. The portable wireless microphone permits the conversation between the law enforcement and a second party to be made part of the recorded incident. A radar interface will replace the target and/or patrol speed data with error data when an error in the opeating parameters of the radar unit is detected. The system controller also provides a control function which prohibits the video recorder from recording over a previously recorded portion of the videotape when the videotape has been either rewound or fast-forwarded from the position where the prior recording was terminated. The system controller and video recorder are enclosed in a temperature controlled sealed vault mounted in the trunk of the law enforcement vehicle.

3 Claims, 16 Drawing Sheets

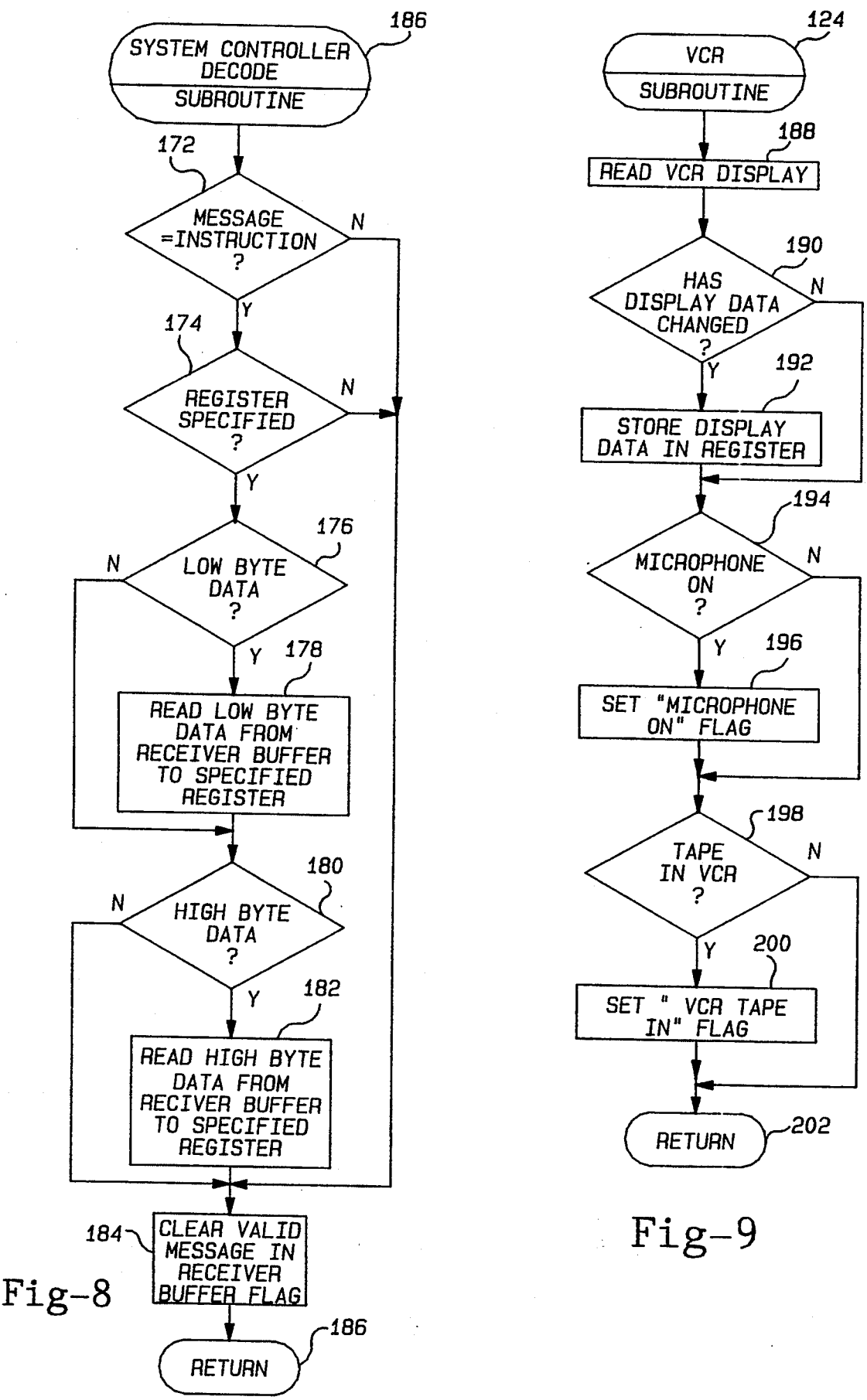

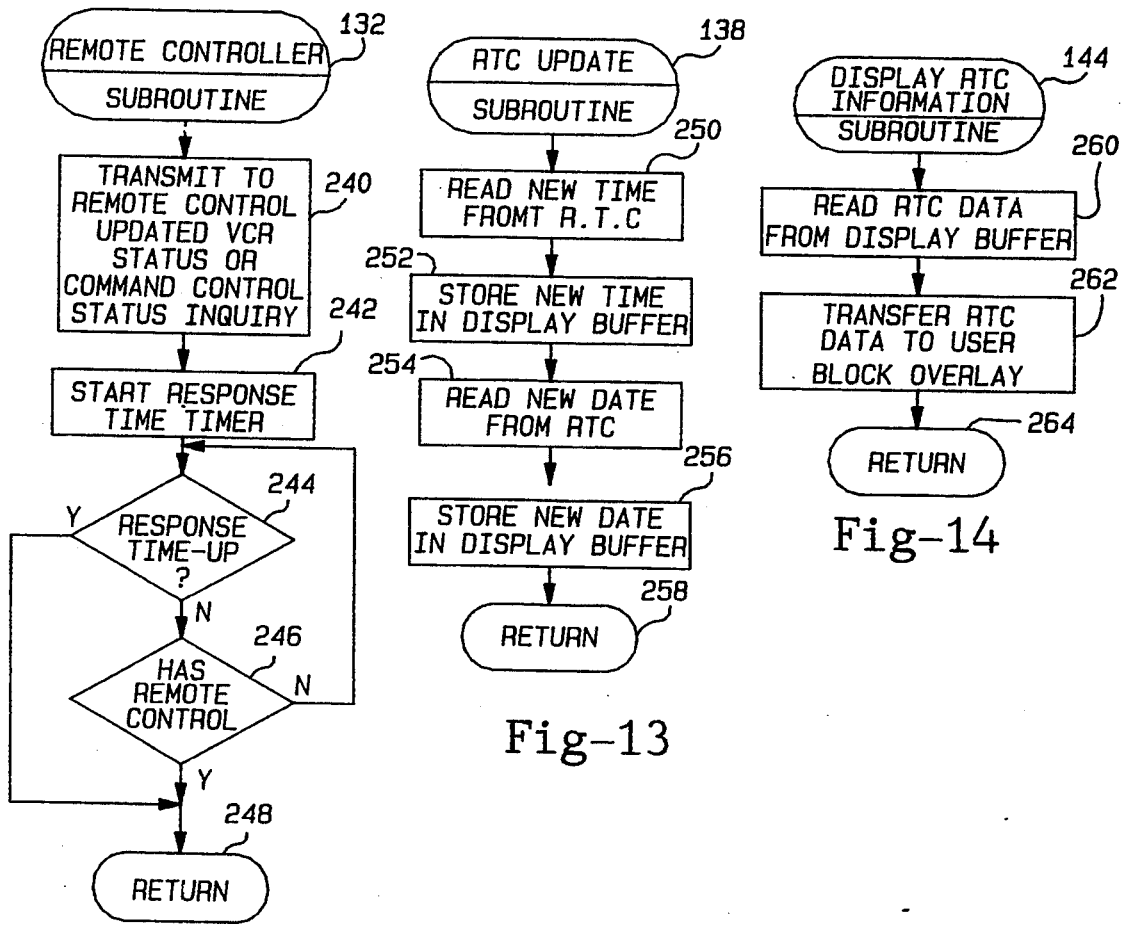
Fig-12
Fig-13
Fig-14
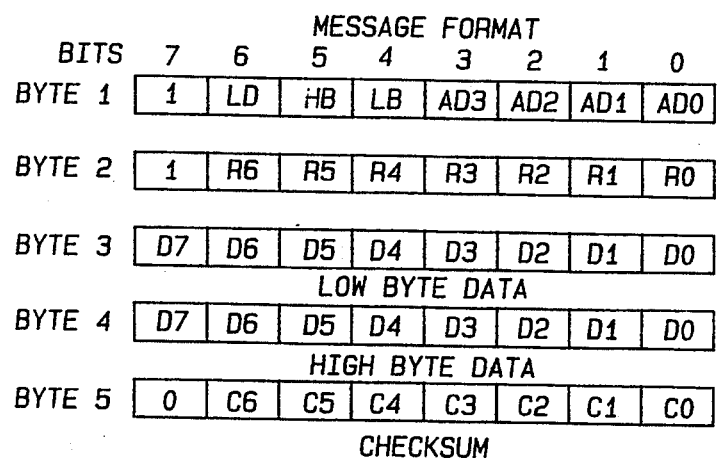
Fig-11

VIDEO INCIDENT CAPTURE SYSTEM

BACKGROUND OF THE INVENTION

1. Field of the Invention

The invention is directed to a surveillance system, and in particular to a surveillance system mounted in a law enforcement vehicle for producing a permanent record, on videotape, of a traffic violation and the incidents that occur after the traffic violator's vehicle has been stopped resulting in an arrest or citation.

2. Prior Art

In law enforcement, a reliable witness that is incapable of perjury is needed to substantiate the actions taken by the law enforcement officer, and to protect the law enforcement officer against false allegations by the persons involved in the incident. An excellent witness of this type is video recording of the incident, which can reviewed after the incident by the officer himself so he can prepare an accurate written report, investigators, prosecutors and/or judges to witness firsthand the incident as it actually happened. These video recordings eliminate conflicting individual interpretations of the incident, since it was recorded while it was happening. As a result, lengthy trials based on the individual interpretations will become a thing of the past.

One of the first uses of a camera in a law enforcement vehicle for making a visual incident record is taught by Grist in U.S. Pat. No. 2,148,119. The Grist reference teaches the use of a camera mounted inside a law enforcement vehicle which makes a record on photographic film. A speedometer mounted on the hood of the law enforcement vehicle is simultaneously recorded on the photographic film along with the target vehicle.

The use of vehicle mounted video cameras to make video records of an incident or scene external to the vehicle are known in the art. Michetti, in U.S. Pat. No. 4,843,463, discloses an audio-visual trip recorder which has two video cameras, one looking forward through the vehicle's windshield and the other looking backwards through the rear window of the vehicle. Superimposed on the recorded images are the time, date, and the vehicle's registration or license number. Also superimposed on the recorded images are indications of the vehicle's speed, activation of the brakes, turn signals, and engagement of the seat belts.

Peterson, in U.S. Pat. No. 4,789,904, discloses a vehicle mounted surveillance system for law enforcement purposes. The surveillance system taught by Peterson includes a video camera, a video recorder, an interface box an environmental control unit and a wireless microphone. The video recorder and interface box are contained within a steel vault mounted in the trunk of the vehicle. The vault contains a heater and a cooling element to maintain the temperature within the vault between 40° F. and 90° F. In the system taught by Peterson, the system control has only two switches, a power ON-OFF switch and a RECORD-STOP switch. The system control does not permit the videotape to be rewound nor does the system control permit re-recording over the videotape. The system control preferably has a real time clock which generates date and time data superimposed on the recorded image. The conversation between the law enforcement officer and the stopped motorist are also recorded on the videotape via the wireless microphone.

The video incident capture system disclosed herein is an improved video surveillance system which integrates the outputs of a video camera, a radar unit, a wireless microphone, a remote control and a wireless microphone to produce a comprehensive video recording of an incident from its beginning to the end.

SUMMARY OF THE INVENTION

The invention is a video incident capture system for a law enforcement vehicle having a video camera for generating video signals of a scene. The video camera is mounted inside the law enforcement vehicle and positioned to photograph the scene through the front window thereof. A video recorder having means for recording the video signals on a videotape, means for rewinding the videotape, means for fast-forwarding the videotape, and means for playing back the videotape to reproduce the video signals. The video incident capture system also includes monitor means responsive to video signals generated by the video camera and the video signals reproduced by the video recorder when playing back the videotape to generate a visual picture, a wireless microphone worn by the operator of the law enforcement vehicle generates a radio signal modulated by received audio communications, a receiver means for generating electrical signals corresponding to the audio communications received by the wireless microphone in response to the radio signals. Radar means are provided for generating at least target speed data indicative of the speed of a target vehicle. A remote control is provided for remotely controlling the video recorder. The remote control has a record key for generating a record code, a rewind key for generating a rewind code, a playback key for generating a playback code, a fast-forward key for generating a fast-forward code and a stop key for generating a stop code. The record, rewind, playback, fast-forward and stop codes are operative to actuate the video recorder to record the video signals on a videotape, to rewind the videotape, to playback the information recorded on the videotape, to fast-forward the videotape and stop the videotape respectively. A system controller integrates the operation of the video recorder, the radar unit and the remote control means. The system controller has a real time clock generating at least the date and time, display block means disposed between the video camera and the video recorder to generating a display block superimposed on the video signals generated by the video camera. The display block displays at least the target speed generated by the radar unit, the date and the time. The system also has means for periodically interrogating the real time clock to transfer the time and date in the display block, means for interrogating the radar means to update the target speed in the display block, means for periodically interrogating the remote control to transfer the record, rewind, playback, fast-forward and stop signals to the video recorder, and means responsive to the record signal for inhibiting the video recorder from re-recording over a previously recorded portion of the videotape.

In a preferred embodiment of the video incident capture system, the video recorder and the system controller are enclosed in an explosion proof, crash proof and bulletproof steel vault mounted within the trunk of the law enforcement vehicle. This steel vault is locked by a service technician excluding the system control and video recorder from being accessed by the operator of the law enforcement vehicle. A heat pump controlled by the System Controller can either heat or cool the interior of the steel vault to maintain its interior temperature between 50° F. and 90° F. The System Controller may be accessed by a plug-in programmer to update the real time clock and program additional data into the display block means such as the patrol unit number or other relevant information. Additionally, the radar means may also generate patrol speed data corresponding to the speed of the law enforcement (patrol) vehicle.

The primary object of the invention is to provide a video incident capture system having means for real time, high speed data transfer between a video camera, a radar unit, a system controller and a video recorder via intelligent serial communication interfaces to provide a permanent unedited video record.

Another object of the invention is a video incident capture system having a plurality of microprocessors operating in a real time multi-task "master/slave" configuration.

Another object of the invention is to provide a video incident capture system in which the information recorded on the videotape includes the time, date, patrol unit number and at least the speed of the target vehicle.

Another object of the invention is a record inhibit control which prohibits the video recorder from recording over a previously recorded portion of the videotape. This permits rewinding of the videotape in order that it may be played back by the operator of the law enforcement vehicle, so that the operator of the target or stopped vehicle can be shown what has been recorded and to refresh the memory of the operator of the law enforcement vehicle so that the details of the incident can be accurately included in his written report.

Another object of the invention is to add the communications between the officer and the operator of a stopped vehicle to the incident recorded on the videotape by means for a portable wireless microphone.

Another object of the invention is to provide the radar unit with a microprocessor controlled radar interface which is responsive to error signals generated by the radar unit to inhibit the recording of the target speed on the videotape when the radar means is malfunctioning.

Still another object of the invention is a radar interface which will insert the types of error detected by the radar unit in place of the target speed data recorded on the videotape, so that in the absence of a displayed error, a recorded target speed can be asserted to be error-free.

These and other objects of the invention may be determined from a reading of the specification in conjunction with the drawings.

BRIEF DESCRIPTION OF THE DRAWINGS

FIG. 8 is a flow diagram of the System Controller Decode Subroutine;

FIG. 9 is a flow diagram of the VCR Subroutine;

FIG. 11 shows the format of the messages used in the system;

FIG. 12 is a flow diagram of the Remote Control Subroutine;

FIG. 13 is a flow diagram of the Real Time Clock (RTC) Update Subroutine;

FIG. 14 is a flow diagram of the Display RTC Information Subroutine;

DETAILED DESCRIPTION OF THE INVENTION

Figure 1:
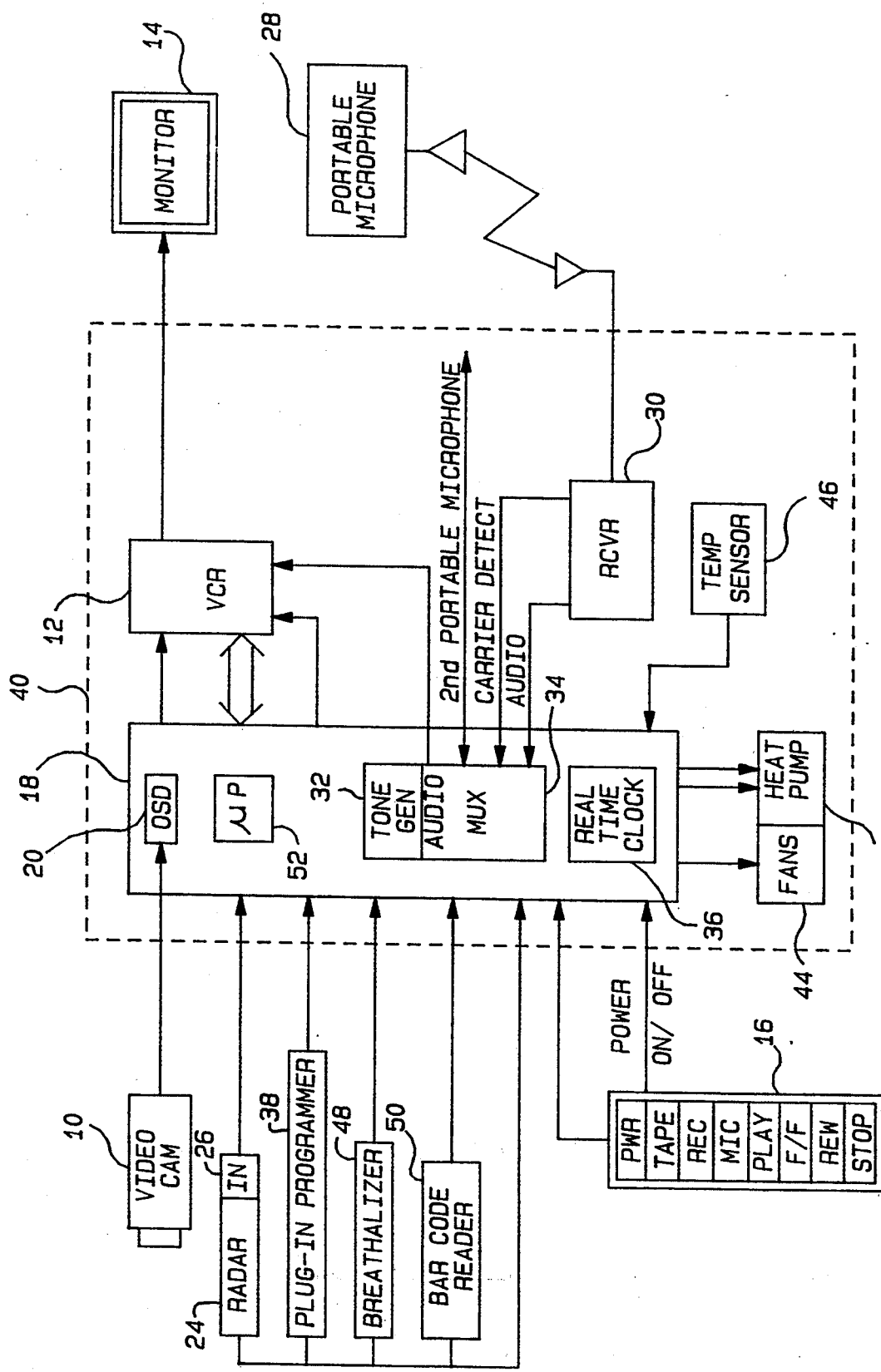
FIG. 1 is a block diagram of the video incident capture system.

FIG. 1 is a block diagram showing the basic components of the Video Incident Capture System. The system is preferably mounted in a law enforcement vehicle, such as a patrol car. A color video camera 10, such as Model No. TK 900U manufactured by JVC, is mounted inside the passenger compartment of the vehicle and is pointed in a forward direction through the windshield. The dimensions of this video camera are 2 inches×2 inches×2.4 inches, and may be mounted between the vehicle's internal rear view mirror and the windshield so as not to obstruct the forward view of the driver or a passenger of the vehicle. The video camera 10 is provided with a wide angle with a motorized iris to increase the operating light range of the video camera. The video signals generated by the video camera 10 are stored on a VHS videotape by a Video Recorder 12, such as Recorder BR16004 manufactured by JVC, mounted in a sealed vault in the trunk of the vehicle. A Video Monitor 14 may display the scene or incident currently being photographed by the video camera 10 or may display a playback of the scene stored on videotape by the Video Recorder 12.

Figure 16:
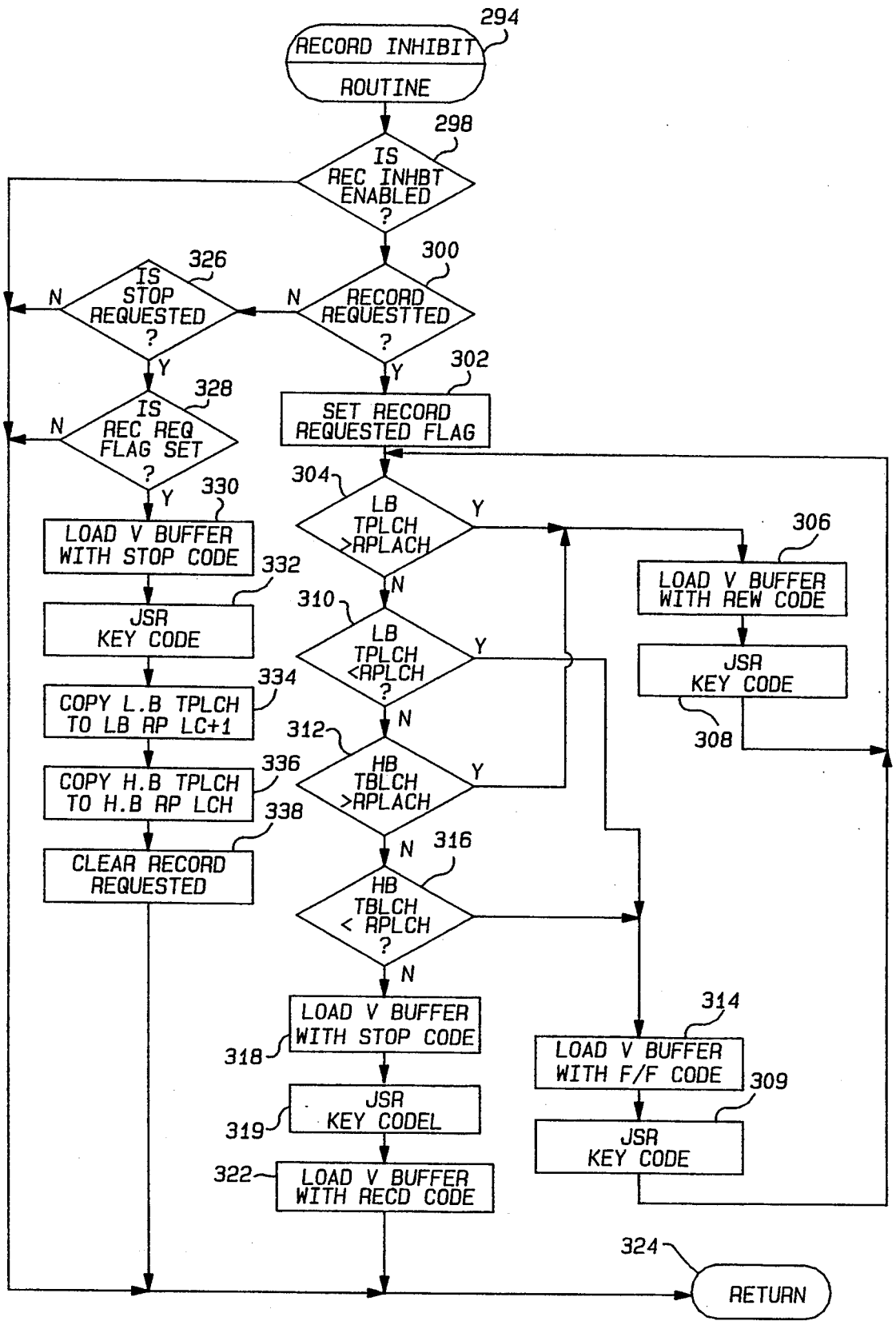
FIG. 16 is a flow diagram of the Record Inhibit Routine.

The Video Recorder 12 records the output of the video camera 10 on a professional grade VHS tape, T-160, which has the capacity to store 8 hours of video information. The Video Recorder 12 is controlled from a Remote Control Unit 16. The Remote Control Unit 16 can activate the Video Recorder 12 to record, play back, fast forward, rewind or stop. This permits the operator of the vehicle full control of the Video Recorder in the vehicle's trunk so that he may rewind the tape and display on the monitor any previously recorded incident. The recording on the tape, however, is controlled by a System Controller 18 which prohibits the Video Recorder 12 from recording over a previously recorded portion of the videotape. As shall be explained later with reference to FIGS. 16 and 17, the System Controller 18 will remember the point on the videotape where the prior recording was terminated and will index to that point on the videotape prior to the resumption of recording in response to the activating of the Video Recorder 12 from the Remote Control Unit 16.

Figure 2:
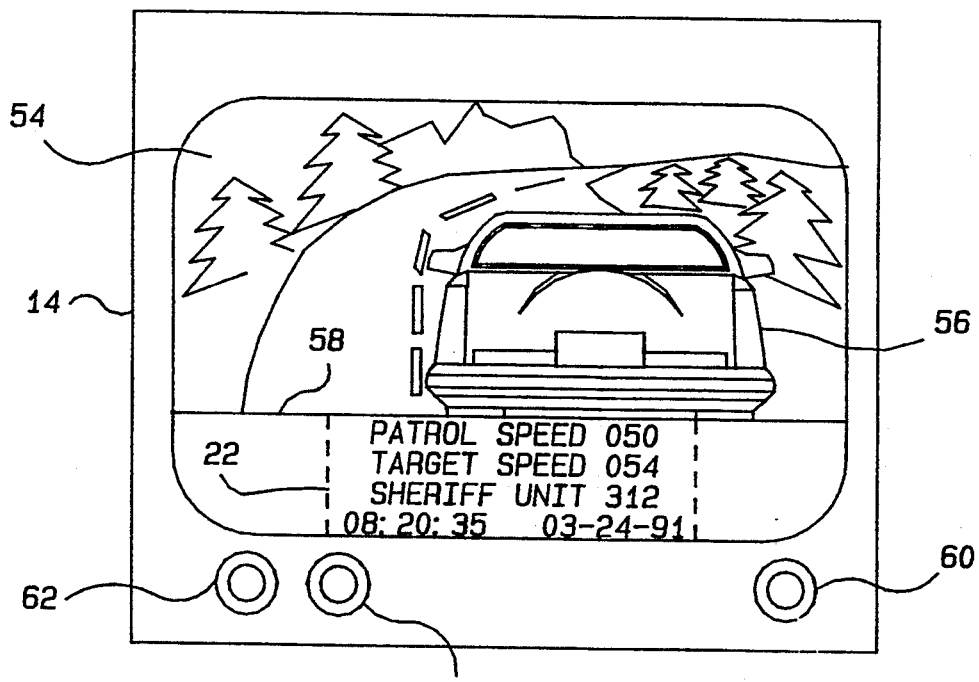
FIG. 2 is a front view of the monitor showing a recorded scene.

Interposed between the video camera 10 and the Video Recorder 12 is an "ON SCREEN DISPLAY" (OSD) circuit 20 which superimposes specified information on the video signals generated by the video camera 10. The specific information is in the form of alpha-numerical characters arranged in the form of a display block 22 normally located near the bottom of the recorded image displayed on the monitor 14, as shown in FIG. 2. The specific information superimposed on video signals generated by the video camera 10 is permanently recorded on the videotape along with the incident recorded by the video camera 10 and becomes a permanent part of the recorded information.

As shown in FIG. 2, the display block 22 preferably contains the month, date and year in the conventional numerical format as well as the time in hours, minutes and seconds. The display block 22 will also contain an identification of the law enforcement vehicle, such as Sheriff Unit 312, in which the Video Incident Capture System is mounted, and when applicable, the speed of an identified vehicle, and the speed of the law enforcement vehicle. In the display block 22, the displayed speeds are identified as "target speed" and "patrol speed" respectively.

The target speed and patrol speed information generated by a Radar Unit 24 such as Kustom KR 105P manufactured by Kustom Electronics of Leneka, Kan. The Radar Unit 24 includes a radar interface 26, shown in FIG. 3, which converts the target and patrol speed data generated by the Radar Unit 24 to the equivalent American Standard Code (ASC II) for display characters. This data is then transferred to the "ON SCREEN DISPLAY" circuit 20 by the System Controller 18 which in turn will superimpose this target and patrol speed information on the video signal generated by the video camera 10. As previously indicated, the scene or incident and the superimposed data will be recorded on the videotape by the Video Recorder 12 and will become an integral part of the recorded information.

The video incident capture system also includes a wireless portable microphone 28, such as portable transmitter Model WT5 manufactured by the Telex Corporation, which is worn by the operator of the vehicle or an assistant, and a receiver 30 mounted in the trunk of the law enforcement vehicle. The portable microphone 28 provides an audio component to the scene or incident being photographed by the video camera. The portable microphone 28 permits the operator to leave the law enforcement vehicle and will permit any conversation between the law enforcement officer and a second party, such as the operator of the vehicle stopped for drunk driving or traffic violations, to be recorded on the videotape.

The System Controller 18 includes a tone generator 32 which superimposes a tone signal over the audio signal generated by the receiver 30. This prevents altering or otherwise changing the recorded audio portion of the videotape. A second vehicle mounted microphone or a second portable microphone comparable to portable microphone 28 may be included to give broader audio coverage if desired.

The receiver 30 will generate a carrier detect signal transmitted to the System Controller 18 when the portable microphone 28 is turned on. The System Controller 18 will in turn activate a visual display MIC key on the Remote Control Unit 16 signifying to the operator that the portable microphone is on.

The Remote Control Unit 16 contains a plurality of function switches and/or visual displays as shown. The key PWR is a power on-off switch which is used to activate or turn off the Video Incident Capture System. The key TAPE is a visual display indicating a videotape is in the Video Recorder 12. The keys REC, PLAY, F/F, REW and STOP are function switches which control the operation of the Video Recorder and provide for manually activating the following functions: record, playback, fast forward, rewind and stop, respectively. Each key is illuminated by a green light emitting diode to facilitate nighttime identification and by a red light emitting diode when the function is activated.

Figure 4:
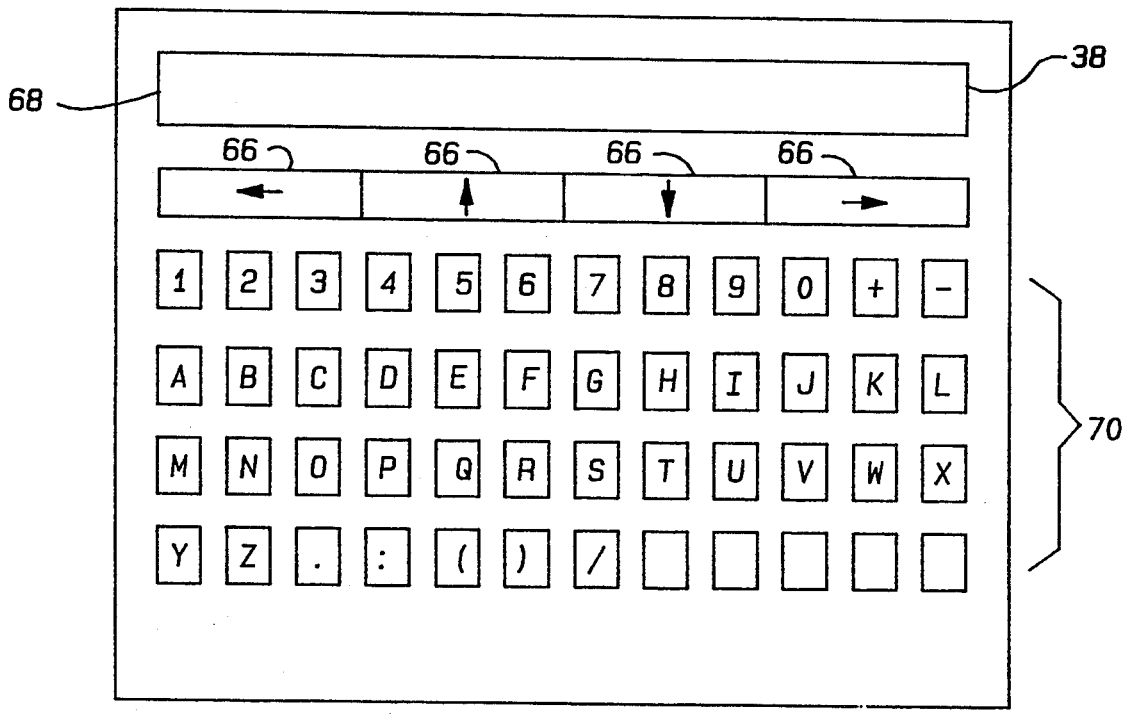
FIG. 4 is a front view of the plug-in programmer.

The System Controller 18 includes a Real Time Clock (RTC) 34, which stores the date and time. The Real Time Clock 34 is programmed by a technician at the time of installation or after a power failure using a hand-held plug-in Programmer 36. The plug-in Programmer 36, as shown in FIG. 4, comprises at least four direction function keys 38 by which the location of the display block 22 can be moved within the image displayed on the monitor 14 and a plurality of alpha numerical keys 40 by means of which the technician can enter the time and date into the real time clock 34 and any other information that is desired, such as the patrol car number. The Programmer 36 is only available to the technician. Therefore, this function is completely removed from the vehicle's operator. The time and date from the real time clock are used to periodically update the time and date being superimposed on the video signals by the on screen display circuit 20 and become a permanent part of the video information recorded by the Video Recorder 12. This prevents the operator from tampering with or otherwise altering either the time or date of the incident recorded.

The System Control 18, the Video Recorder 12 and the receiver 30 are enclosed in a locked protective steel vault, indicated by dashed line 40 in FIG. 1. This steel vault is insulated with a resin coated fiberglass insulation, is bulletproof, and resistent to damage due to an explosion or a crash. The steel vault 40 has a recessed key lock and can only be opened by a designated technician. The operator of the vehicle has no access to the Video Recorder 12 or any other component inside of the steel vault 40 and therefore cannot remove, replace or exchange or otherwise alter the videotape in the video recorder. A new videotape is put into the Video Recorder 12 at the beginning of each work shift by the technician.

In order to insure efficient operation of the Video Recorder and prevent degration of the videotape, the temperature inside of the steel vault 40 is controlled using a solid state heat pump 42 and air circulation fans 44. The heat pump 42 and fans 44 are controlled by the System Controller 18 in response to a temperature sensor 46 sensing the ambient temperature inside the steel vault. The system controller 18 activates the heat pump 42 to heat or cool the inside of the protective steel vault to maintain its internal temperature between 50° F. and 90° F. independent of ambient external temperatures. The heat pump can maintain the internal temperature within the specified range for external ambient temperatures in the range from −20° F. to approximately 160° F. If the external temperatures exceed these limits, the system control 18 will turn the Video Incident Capture System off.

The Video Incident Capture System may optionally include a Breathalizer Unit 48 which will generate a signal indicative of the alcohol content of a person's breath which by means of the on screen display 20 be superimposed on the video signals generated by the video camera 10 and stored on the videotape by the Video Recorder 12. The alcoholic content data will be included in the display block 22 along with the other relevant information.

In the event that bar codes are included on the driver's license in the future, the Video Incident Capture System may also include a bar code reader 50 which can read the driver license bar code and add the driver license number, the full name, and the address of the licensed driver to the display block 22.

The System Controller 18 includes a microprocessor 52, buffers, registers interfaces and memory sufficient for the operation of the Video Incident Capture System. The System Controller 18 controls and integrates the operations of the various subsystems to provide a system which is easy to operate and having a minimal number of controls. The detailed operation of the System Controller 18 will be discussed with reference to the flow diagrams shown in FIGS. 5–17.

The monitor 14 is shown in FIG. 2. The monitor 14 preferably has a black and white 5.5 inch picture tube 54 and at least one speaker, not shown. FIG. 2 shows the monitor 14 displaying a typical incident in which a law enforcement vehicle is following a target vehicle 56. The display block 22, outlined in phantom, is centrally located at the bottom of the displayed scene and is located in region occluded by the hood 58 of the law enforcement vehicle in which the Video Incident Capture System is installed. As shown in FIG. 2, the display block 22 displays the target speed, the patrol speed, and the Sheriff Unit No., as well as the date and time.

Figure 3:
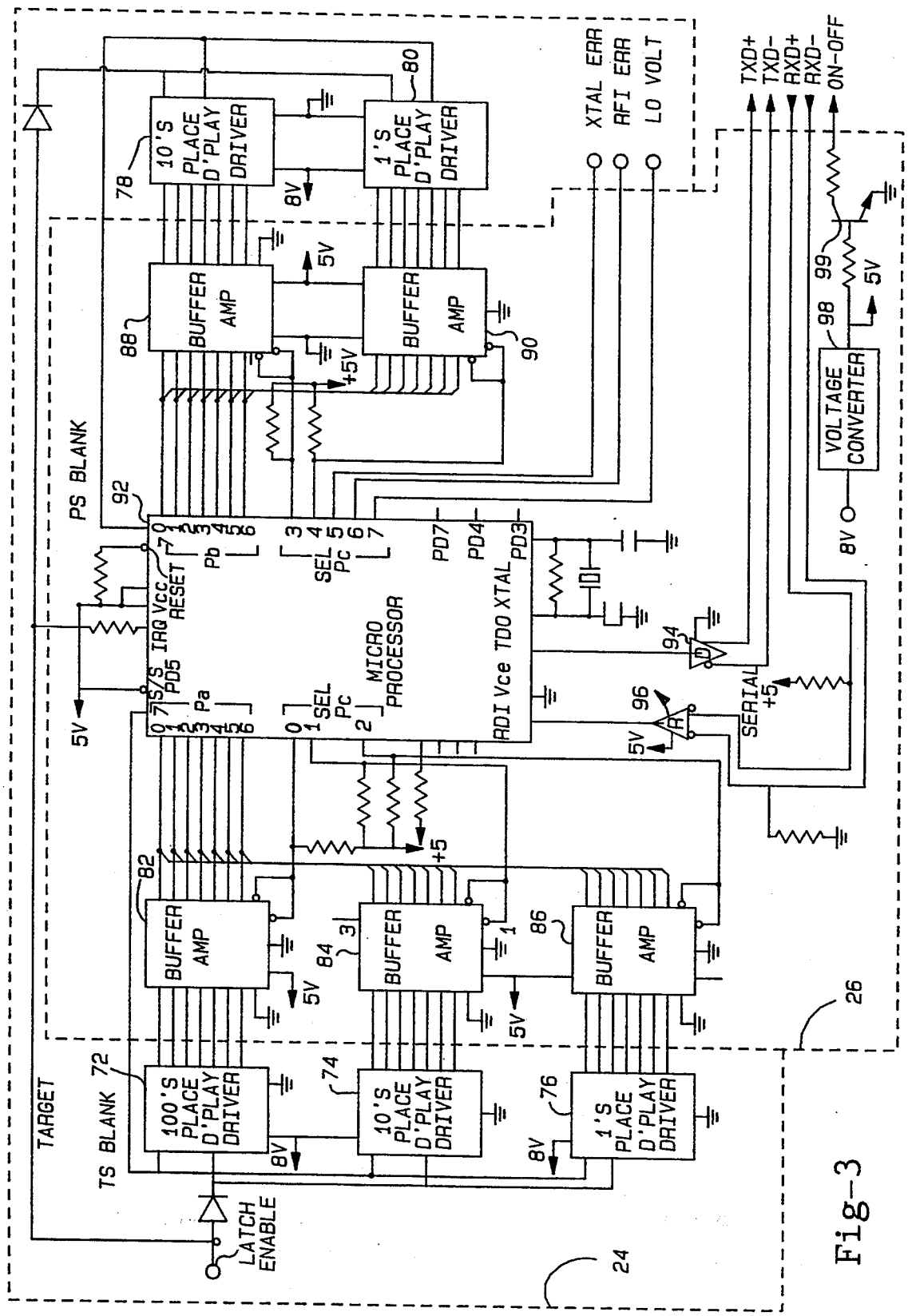
FIG. 3 is a circuit diagram of the radar interface.

The monitor 14 also includes conventional controls normally associated with a video monitor, such as an on-off volume control 60, a brightness control 62 and a contrast control 64. The monitor 14 is mounted in a position forward of the vehicle's front seat so that it can easily be observed by the vehicle's operator. FIG. 3 shows the details of the radar interface 26 and the relevant portions of the Radar Unit 24. The Radar Unit 24 is shown to have three display drives 72, 74 and 76 storing respectively the 100's place, the 10's place and the 1's place of the speed of the target vehicle. The Radar Unit 24 also has a 10's place display driver 78 and a 1's place display driver 80 storing respectively the speed of the patrol vehicle. The display drivers 72 through 80 are used to drive the visual display of the Radar Unit 24 itself.

The target vehicle and patrol vehicle speeds are stored in the display drivers by a latch enable signal generated by the Radar Unit 24. The target speed information stored in display drivers 72–76 are amplified and stored by buffer amplifiers 82–86 respectively and transferred to a radar interface microprocessor 92, such as an MC68 microprocessor manufactured by Motorola, or any equivalent thereof. The radar interface microprocessor 92 has an internal random access memory in which the 100's place, 10's place and 1's place data for the speed of the target vehicle is stored. The radar interface microprocessor 92 will sequentially enable buffer amplifiers 82 through 86 to transfer the data currently being stored in the display drivers 72 through 76 into selected memory locations in the random access memory of the radar interface microprocessor 92 in response to the latch enable signal generated by the Radar Unit 24. The latch enable signal is received at the IRQ input of the radar interface microprocessor 92.

In a like manner, the date corresponding to the speed of the patrol vehicle is stored in the display drivers 78 and 80 are also transferred to selected memory locations in the random access memory through buffer amplifiers 88 and 90.

The radar unit 24 will also generate a crystal (XTL) error signal when the frequency of the signal generated by its oscillator is in error, a RFI error signal when there is excessive radio frequency signal interference which would produce an error in the speed readings, and LOW voltage error signal in response to the opeating voltage of the Radar Unit 24 being below a predetermined minimum voltage. These error signals are normally provided on the Radar Unit 24 by energizing a light emitting diode which produces a visual signal indicating that Radar Unit 24 is malfunctioning. The radar interface microprocessor 92 will continuously interrogate these light emitting diodes to determine if the Radar Unit 24 is in proper working order.

In response to detecting an error in the operation of the Radar Unit 24, the radar interface microprocessor 92 will place data corresponding to the error detected by the Radar Unit 24 in the selected locations in the random access memory for the 100's place, 10's place and 1's place speed data for the target speed. In particular, the microprocessor 92 will place data corresponding to the letters "XTL" in the 100's place, 10's place and 1's place selected locations of the random access memory respectively in response to detecting that the crystal error light emitting diode is lit, or the letters "RFI" in response to detecting the RFI light emitting diode being lit or the letters "LOW" in response to detecting the low voltage error light emitting diode being lit.

As long as any one of the light emitting diodes signifying a possible error with the Radar Unit 24 is lit, the microprocessor will store the appropriate letters corresponding to the error rather than the speed data of the target vehicle. The radar interface microprocessor may also have the equivalent of a 100's place memory location for the speed data of the patrol vehicle, which permits the letters XTL, RFI and LOW also to be stored in place of the speed data of the patrol vehicle when one of the light emitting diodes signifying an error is lit.

The radar interface microprocessor 92 serially transmits the data stored in the random access memory to the System Controller 18 via amplifier 94 in response to the request for data message received at its read data input (RDI) terminal. The 100's place data, the 10's place data and the 1's place data for both the speed of the target vehicle and the speed of the patrol vehicle will be sent in separate messages which identify the source of the data, and the location where it is to be stored in the System Controller 18.

The request for data message received by the radar interface 26 is amplified by operational amplifier 96 prior to being applied to the read data in (RDI) terminal of the radar interface microprocessor 92.

The Radar Unit 24 is manually activated by the operator of the law enforcement vehicle, when he wishes to monitor the speed of a target vehicle. The turning on of the Radar Unit 24 will provide the required voltage for the operation of the Radar Interface 26, such as 5 volts as indicated in FIG. 3. If the operating voltage of the Radar Unit 24 is different from the operating voltage of the Radar Interface 26, a step down or step up voltage converter 98 is required to generate the proper operating voltage for the Radar Interface 26. In the instant application, the operating voltage of the Radar Unit is 8 volts while the operating voltage of the Radar Interface is 5 volts. The voltage will be a step down converter which converter 98 will convert the 8 volts used by the Radar Unit 24 to 5 volts. The 5 volt output of the voltage converter 98 is also applied to the base of a transistor 99 which functions as an ON-OFF sensor generating a ground signal when the Radar Unit 24 and the Radar Interface 26 are turned ON. This signal is sent directly to the System Controller 18.

The details of the operation of the Radar Interface 26 will be discussed relative to the flow diagrams shown in FIGS. 18 to 23.

The details of the plug-in Programmer 38 are shown in FIG. 4. The Programmer 38 has four function keys 66 which are used to program the location of the display block 22 stored on the videotape. The function keys will move the location of the display block in the direction indicated by the arrows imprinted thereon. The Programmer 38 will also include a full set of alpha-numerical keys 70 by means of which the real time clock 36 can be programmed and by means of which other information can be programmed into the display block 22. An LED or liquid crystal display 68 provides the technician a visual indication of the information being entered into the System Controller 18.

The details of the System Controller 18 will be described relative to the flow diagram shown in FIGS. 5–17. As previously indicated, the System Controller 18 integrates the operation of the individual subcomponents of the Video Incident Capture System.

The operation of the System Controller 18 will first be discussed relative to the System Controller Routine 100 shown in FIG. 5. This System Controller Routine 100 begins by initializing the ports and registers of the System Controller 18, as indicated in block 102, then waits for an actuation of the power ON-OFF key of the Remote Control Unit 16. The power ON-OFF key generates a pulse signal which toggles the Video Incident Capture System (VICS) between an ON mode and a STOP mode. In decision block 104, the microprocessor first inquires if the Video Incident Capture System is currently in the STOP mode. If the system in not in the STOP mode, i.e. it is currently in the ON mode, the microprocessor 52 will turn OFF the power relays and the peripherals placing the VICS system in the STOP mode, as indicated by block 106, then wait for the next pulse signal from the power ON-OFF key, as indicated by block 108. However, if the system is currently in the STOP mode, the microprocessor 52 will proceed to turn on the power relays, as indicated in block 110, and turn ON the peripherals, such as the video camera 10, the Video Recorder 12, the Monitor 14, the Receiver 30, the plug-in Programmer 38 and the Breathalizer 48 and Bar Code Reader 50 when they are included in the system, as indicated by block 112.

After the peripherals are turned on, the microprocessor will set the Real Time Clock 36 to interrupt 16 times per second, as indicated by block 114, then clear all buffers, as indicated by block 116. The interrupt signals increment a 4 bit select counter which repetitiously signifies one of four sequential select states, SELECT 1 through SELECT 4 inclusive.

After the buffers are cleared, as indicated by block 116, the microprocessor will await, as indicated by block 118, for the occurrence of an interrupt signal. As each interrupt signal is generated, the microprocessor 52 will first inquire, decision block 120, if the select counter is in the SELECT 1 state. If the state of the select counter is SELECT 1, the microprocessor will proceed to execute the Radar Subroutine, as indicated in block 122, the (video recorder) VCR Subroutine, as indicated in block 124, then return to block 118 and await the next interrupt signal. The Radar Subroutine 122 shall be fully discussed with reference to the flow diagram shown in FIG. 6. The Radar Subroutine 122 sends a message to the Radar Unit 24 requesting target and patrol speed data. The details of the VCR Subroutine indicated by block 124 will be explained relative to the flow diagram shown in FIG. 9. The VCR Subroutine 124 is an equiry directed to the current status of the Video Recorder 12 and the portable microphone 28. If the select state is not SELECT 1, the microprocessor will inquire, as indicated in decision block 126, if the select state is SELECT 2. When the state of the select counter is SELECT 2, the microprocessor 52 will sequentially execute the Radar Subroutine and the VCR Subroutine, blocks 122 and 124 respectively, then execute the Temperature Subroutine, as indicated by block 128. The details of the Temperature Subroutine 128 will be discussed with reference to the flow diagram shown in FIG. 10. The Temperature Subroutine controls the operation of the heat pump 42 and fans 44 to maintain the temperature inside the steel vault 40 between 50° to 90° F. After completing the Temperature Subroutine 128, the process will return to block 118 and await the next interrupt signal generated by the Real Time Clock 36.

When the state of the select counter is SELECT 3, as indicated by decision block 130, the microprocessor 52 will execute the Radar Subroutine and the Remote Control Subroutine, as indicated by blocks 122 and 132 respectively, then return to block 118 and await for the next interrupt signal. The Remote Control Subroutine 132 transmits to the Remote Control Unit 16 an updated VCR status message or a Remote Control status inquiry message to determine which keys on the Remote Control Unit 16 have been actuated.

The microprocessor 52, in response to the state of the select counter being Select 4 as indicated by decision block 134, will clear the select counter as indicated by block 136, then execute the Radar Subroutine and the Real Time Clock Update Subroutine, as indicated by blocks 122 and 138. After completing the Real Time Clock Update Subroutine 138, the microprocessor 52 will inquire, decision block 140, if the plug-in Programmer 38 is plugged in. If the plug-in Programmer 38 is plugged in, the microprocessor will execute the Programmer Subroutine, as indicated in block 142, then return to block 118 and await the next interrupt signal. Alternatively, if the plug-in Programmer 38 is not plugged in, the microprocessor will execute the Display Real Time Clock (RTC) Subroutine, as indicated by block 144, then return to block 118 and await for the next interrupt.

Figure 5:
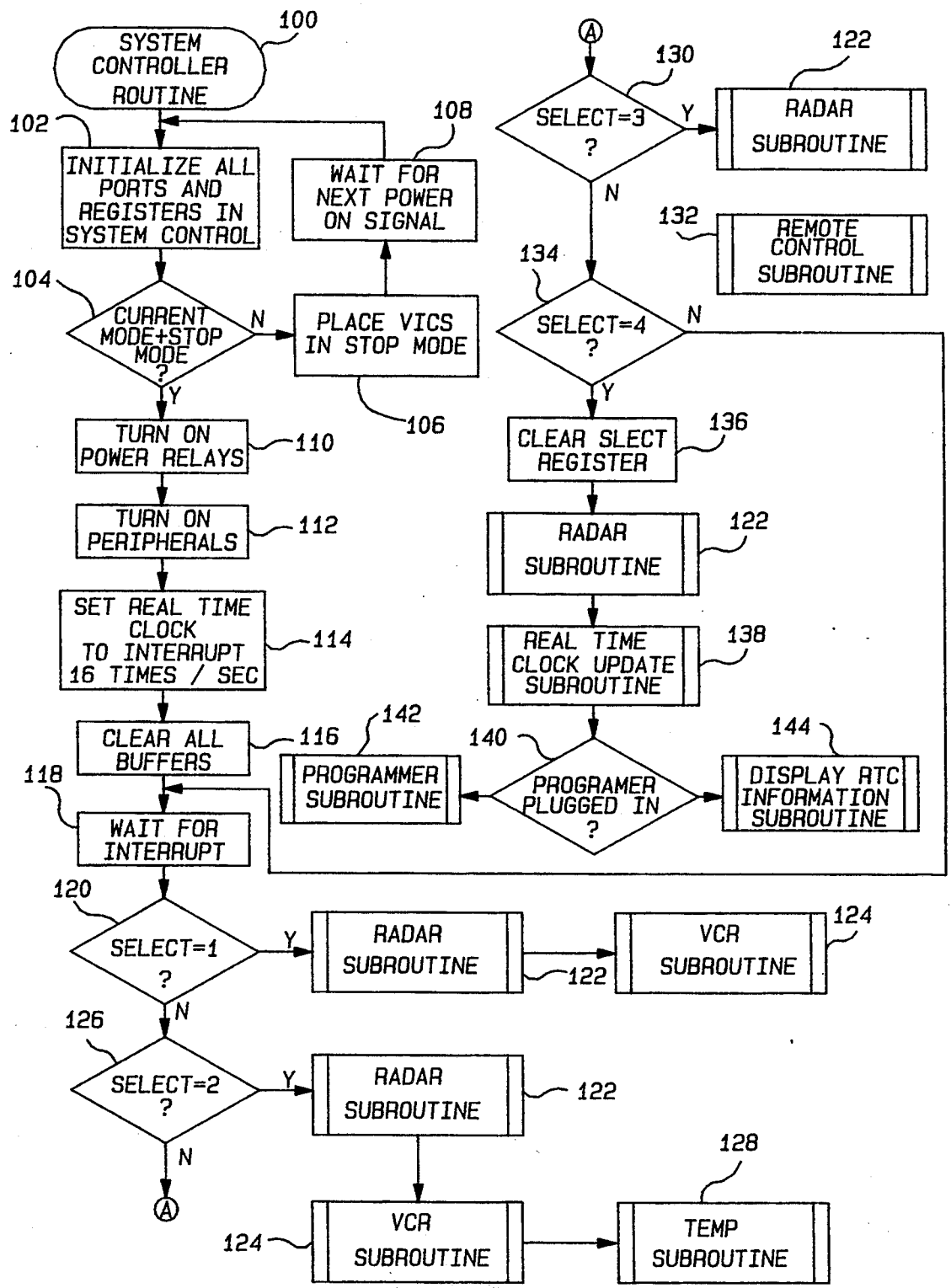
FIG. 5 is a flow diagram of the System Controller Routine.

As is evident from the System Controller Routine 100 shown in FIG. 5, the System Controller 18 will execute the Radar Subroutine 122 16 times a second, effectively updating the target speed data and patrol speed data being recorded by the Video Recorder 12 every 60 milliseconds. Also, the Systems Controller will execute the VCR Subroutine 124 8 times each second, and the Temperature Subroutine, the Command Unit Subroutine 132, Real Time Clock Subroutine 138 and Display Real Time Clock Subroutine 144 at least four times every second. It will also either execute the Programmer Subroutine 142 four times a second, if the Programmer 38 is plugged in.

Figure 6:
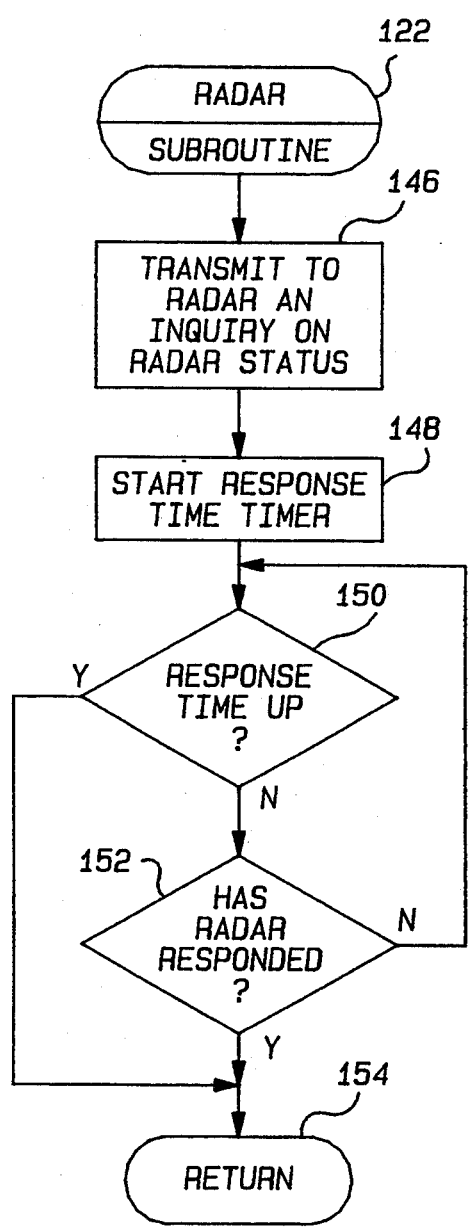
FIG. 6 is a flow diagram of the Radar Subroutine.

The details of the Radar Subroutine 122 will be discussed relative to the flow diagram shown in FIG. 6. The Radar Subroutine 122 begins with the microprocessor transmitting an inquiry to the Radar Unit 24 for status information, as indicated by block 146. The microprocessor will then start a response time timer, as indicated by block 148 and inquire, decision block 150, if the response time is up. If the response time is not up, the microprocessor will inquire, decision block 152, if the Radar Unit 24 has responded to the transmitted inquiry. If the Radar Unit 24 has responded by transmitting radar data back to the System Controller 18, the Radar Subroutine 122 will end and return to the System Controller Routine 100 being executed by the microprocessor, as indicated by return block 154. If the Radar Unit 24 has not responded, the Radar Subroutine 122 will recycle as indicated until the Radar Unit 24 has responded to the inquiry or the response time timer has timed out.

Figure 7:
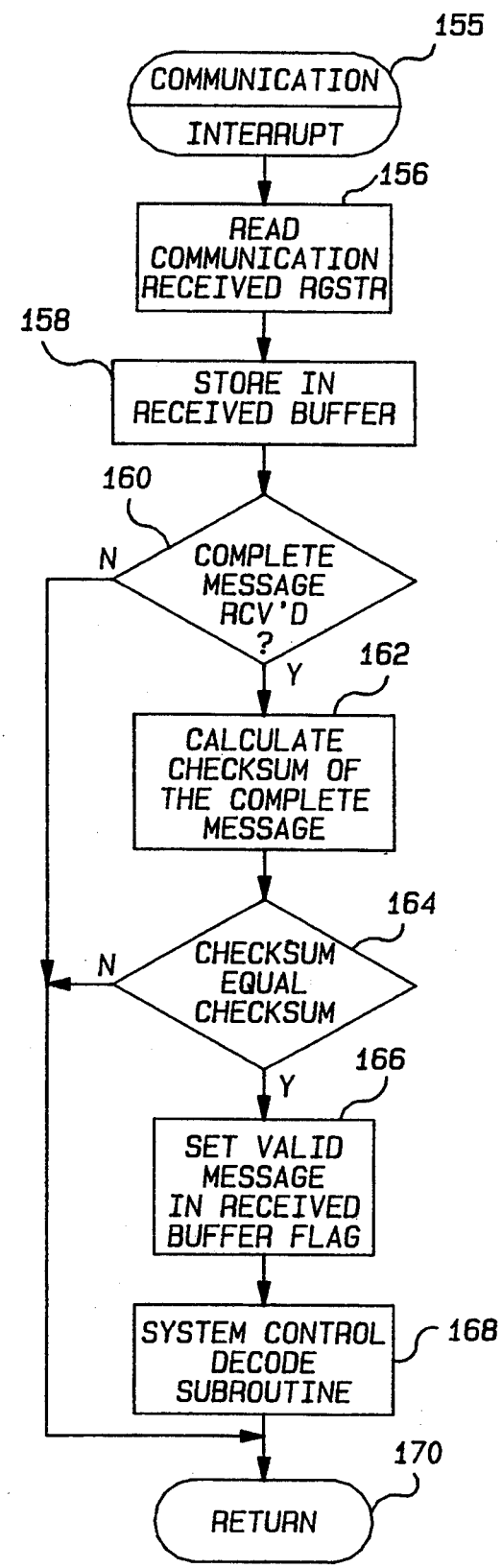
FIG. 7 is a flow diagram of the Communication Interrupt.

The receipt of data from the Radar Unit will initiate a Communication Interrupt, shown in FIG. 7, which is executed by the microprocessor 52. The Communication Interrupt begins by reading the data in a communication received register of the System Controller 18, as indicated by block 156, and storing this data in a received buffer, as indicated by block 158. The microprocessor will then inquire if a complete message has been received, as indicated by decision block 160.

As shown in FIG. 11, each message transmitted within the Video Incident Capture System between the System Controller 18 and any peripheral, including the Radar Unit 24, comprises five (5) bytes. Each byte of the message contains 8 bits, bits 0 through 7.

In the first byte, Byte 1, the most significant bit, bit 7, is a check bit and is always 1. Bit 6 tells the receiver what to do with the message. If bit 6 is a 1, the receiver will load the message into a specified register. If bit 6 is a 0, it indicates the data is to be sent to a specified register. Bit 5 signifies the message contains high byte data, and Bit 4 signifies the message contains low byte data. Bits 3–0 are the address of the component that sent the message.

Byte 2 contains a 1 bit in the 7 bit position which is used for error detection, and bits 6–0 contain the address of the specified register where the data is to be stored. Byte 3 contains the low byte data, and Byte 4 contains the high byte data. Bits 6–0 of Byte 5 contain checksum data for the message, and is used to determine if the message is error free. Checksum is an error detection procedure well known in the art. Bit 7 of Byte 5 is always a 0, and is also used to detect a transmission error.

Returning to FIG. 7, if the message contains 5 bytes, then it is concluded, decision block 160, that a complete message has been received and the microprocessor will proceed to calculate the checksum of the complete message, as indicated by block 162. Otherwise, if the message received is not complete, the microprocessor will terminate the Communication Interrupt and return to the System Controller Routine 100, as indicated by return block 120.

After calculating the checksum, the microprocessor will compare the calculated checksum with the checksum contained in Byte 5 of the received message, as indicated in decision block 164. If the two checksums are equal, the microprocessor will set a "valid message in received buffer" flag, as indicated in block 166, and proceed to the System Controller Decode Subroutine, as indicated in block 168. The details of the System Controller Decode Subroutine 168 are shown in FIG. 8. If the checksums are not equal or after the microprocessor completes the System Controller Decode Subroutine 168, the microprocessor will terminate the Communication Interrupt and return to the System Controller Routine, as indicated by block 170.

The System Controller Decode Subroutine 168, as shown in FIG. 8, begins with inquiring if the message is an instruction to do something, as indicated by decision block 172. This information is determined by the state of bit 6 of the first byte of the message. If it is an instruction, the microprocessor will next inquire, decision block 174, if the message specifies a register in which the data is to be stored. The address of the specified register where the data is to be stored is contained in the second byte of the received message, as explained relative to the message format shown in FIG. 11. The microprocessor will then inquire, decision block 176, if the data is low byte data which is contained in byte 3 of the message. This is signified by bit 4 of the first byte of the message. If there is low byte data, the microprocessor will read the low byte data contained in byte 3 of the message and store it in the specified register, as indicated by block 178, then proceed to inquire decision block 180, if the message contains high byte data. If there is no low byte data in the message, the microprocessor will proceed directly to decision block 180 and inquire if the message contains high byte data. This is indicated by bit 5 of the first byte. If there is high byte data in the message, the microprocessor will read the fourth byte of the message stored in the receiver buffer and store it at the specified address, as indicated by block 182.

After storing the high byte data in the specified register, block 182, or after the microprocessor determines that the message is not an instruction, decision block 172, or that there is no high byte data in the message, the microprocessor will clear the "valid message in receiver buffer" flag, as indicated by block 184, and return as indicated by return block 186 to the Communication Interrupt routine shown in FIG. 7.

The details of the VCR Subroutine 124 are contained in the flow diagram shown in FIG. 9. The VCR Subroutine 124 begins by reading the VCR display data stored in the display register, as indicated by block 188, then the microprocessor will compare this information with the updated display data to determine if it has changed, as indicated by decision block 190. If the display data has not changed, the microprocessor will proceed to inquire, decision block 194, if the microphone is on. Alternatively, if the display data has changed, the microprocessor will store the updated display data in the display register, as indicated by block 192, then proceed to inquire, decision block 194, if the microphone 28 is on. This condition is determined by the presence of carrier detected signal generated by the Receiver 30 when the microphone 28 is ON and is generating a carrier signal. If the microphone 28 is ON, the microprocessor will set a "microphone on" flag, as indicated by block 196, then proceed to inquire, decision block 198, if there is a videotape in the Video Recorder 12. If there is a tape in the Video Recorder 12, the microprocessor will set a "tape in VCR" flag, as indicated by block 200. The VCR subroutine will then return, as indicated by return block 202, to the System Controller Routine shown in FIG. 5.

Figure 10:
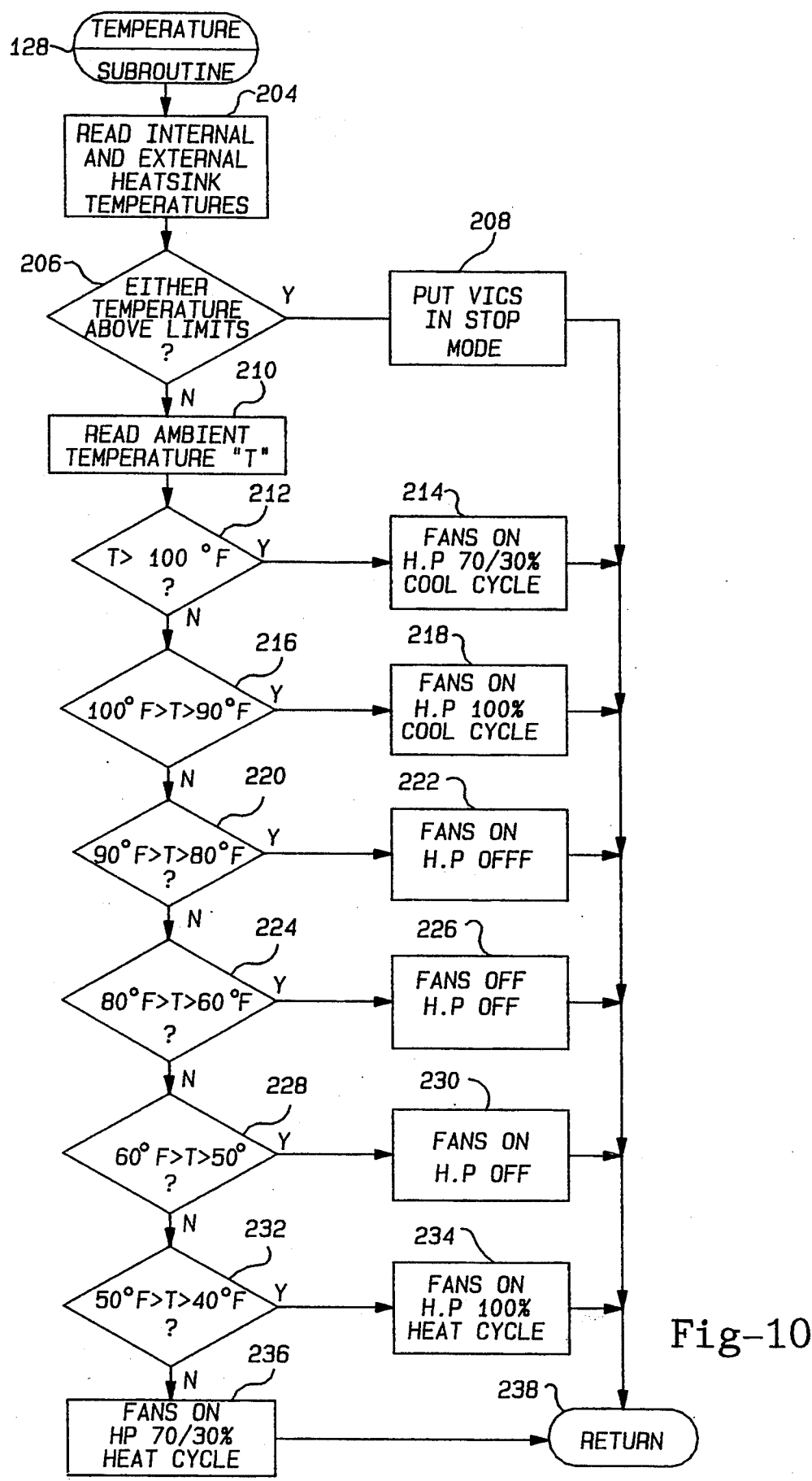
FIG. 10 is a flow diagram of the Temperature Subroutine.

The details of the Temperature Subroutine 128, shown in FIG. 10, begins by reading internal and external heat sink temperatures, as indicated by block 204. The internal heat sink temperature is the temperature inside of the vehicle's trunk while the external heat sink temperature is the temperature outside the vehicle. If either of these temperatures exceed predetermined limits, as indicated by decision block 206, the System Controller 18 will put the Video Incident Capture System in the STOP mode. However, if neither of these heat sink temperatures exceed their respective predetermined limits, the heat pump 42 will be able to maintain the ambient temperature within the steel vault 40 within the video recorder's operating temperature limits. Effectively, the heat pump 42 can maintain the ambient temperature inside the steel vault 40 between 50° F. to 90° F. when the temperatures of the internal and external heat sinks are within the range from −20° F. to +160° F., which are the operating external temperature limits of the Video Incident Capture System.

If the internal and external heat sink temperatures are within the predetermined limits, the microprocessor will proceed to read the ambient temperature (T) inside of the steel vault 40 as indicated by block 210. If the ambient temperature T is greater than 100° F., decision block 212, the microprocessor will turn ON the fans 44 and actuate the operation of the heat sink using a 70% ON/30% OFF cooling duty cycle, as indicated by block 214. The 70/30% duty cycle is used when the ambient temperature is greater than 100° F. and is to prevent the heat pump from burning out. The cooling produced by this 70%/30% cooling duty cycle is sufficient to lower the temperature inside the steel vault 40 to below 100° F.

If the ambient temperature (T) inside the steel vault 40 is less than 100° F. but greater than 90° F. decision block 216, the microprocessor will turn ON the fans 44 and activate the heat pump 42 at a 100% cool cycle, as indicated by block 218. This will rapidly lower the ambient temperature (T) within the steel vault 40 to less than 90° F. If the ambient temperature (T) is less than 90° F. and greater than 80° F., decision block 220, the microprocessor will turn ON the fans 44 and turn OFF the heat pump 42 as indicated by block 222. Alternatively if the ambient temperature T is between 60° F. and 80° F. decision block 224, the microprocessor will turn OFF both the fans 44 and the heat pump 42, as indicated by block 226. When the ambient temperature (T) is less than 60° F. but greater than 50° F., decision block 228, the microprocessor will turn ON the fans 44 but leave the heat pump 42 OFF, as indicated by block 230. However, if the ambient temperature (T) is less than 50° F. but greater than 40° F., decision block 232, the microprocessor will turn ON the fans 44 and actuate the heat pump 42 at a 100° F. heating duty cycle, as indicated by block 234, to heat the inside of the steel vault 40. When the ambient temperature (T) is less than 40° F., the microprocessor will turn ON the fans 44 and actuate the heat pump 42 using a 70% ON/30% OFF heating duty cycle to prevent burning out the heat pump 42. This 70%/30% heating duty cycle is sufficient to heat the interior of the steel vault to above 40° F., at which temperature the heat pump can be operated at a 100% heating duty cycle because the heat generated by the heat pump 42 when operating at a 100% heating duty cycle will quickly raise the ambient temperature (T) within the steel vault 40 above 50° F., at which temperature it will be turned off. Therefore, the length of the time the heat pump will be operated at a 100% heating duty cycle will be relatively short so that burn out of the heat pump 42 does not occur. This same design philosophy is used when the heat pump 42 is operated at a 100% duty cooling cycle when the ambient temperature (T) inside the steel vault 40 is between 100° F. and 90° F.

After the VIC is put in the STOP mode, block 208, or the fans 44 or the heat pump 42 are activated in accordance with instructions of blocks 214, 218, 222, 226, 230, 234 or 236, the Temperature Subroutine 128 will be terminated and return, as indicated by RETURN block 238, to the System Controller routine shown in FIG. 5.

FIG. 12 shows the details of the Remote Control Subroutine 132. This subroutine begins by transmitting updated VCR status or a remote control status inquiry, as indicated by block 240, then start a response time timer, as indicated in block 242. The microprocessor 52 will then inquire, decision block 244, if the response time timer has expired. If the response time has expired prior to a response being received from the Remote Control Unit 16, the subroutine will be terminated and the microprocessor will return to the System Controller routine shown in FIG. 5. However, if the response time timer has not expired, the microprocessor 52 will inquire, decision block 246, if the Remote Control Unit 16 has responded. If the Remote Control Unit 16 has responded, then the Remote Control Subroutine will terminate, as indicated by RETURN block 248, otherwise the subroutine will wait for either the receipt of a response from the Remote Control 16 or the expiration of the response time timer.

The details of the Real Time Clock (RTC) Update Subroutine 138 are shown in FIG. 13. This subroutine begins by reading the new time from the Real Time Clock 36, as indicated by block 250, then storing the new time in the display buffer, as indicated by block 252. The microprocessor will then read the new date from the Real Time Clock 36, block 254, and store the new date in the display buffer. The display buffer stores the data which is superimposed on the video signal generated by the Video Camera 10 by the on screen display (OSD) circuit 20. After the new time and new date are stored in the display buffer, the RTC Update Subroutine 138 is terminated, and the microprocessor returns to the system routine shown in FIG. 5.

FIG. 14 shows the details of the Display RTC Information Subroutine 144. In this subroutine, the information in the display buffer is read, as indicated by block 260, then transferred to the user block overlay 262. The information stored in the user block overlay is the information contained in the display block 22 superimposed on the video signal by the on screen display (OSD)

circuit 20 and stored on the videotape. After the RTC data is transferred to the user block overlay, the Display RTC Information Subroutine 144 is terminated and the procedure returns, RETURN block 264, to the System Controller routine shown in FIG. 5.

Figure 15:
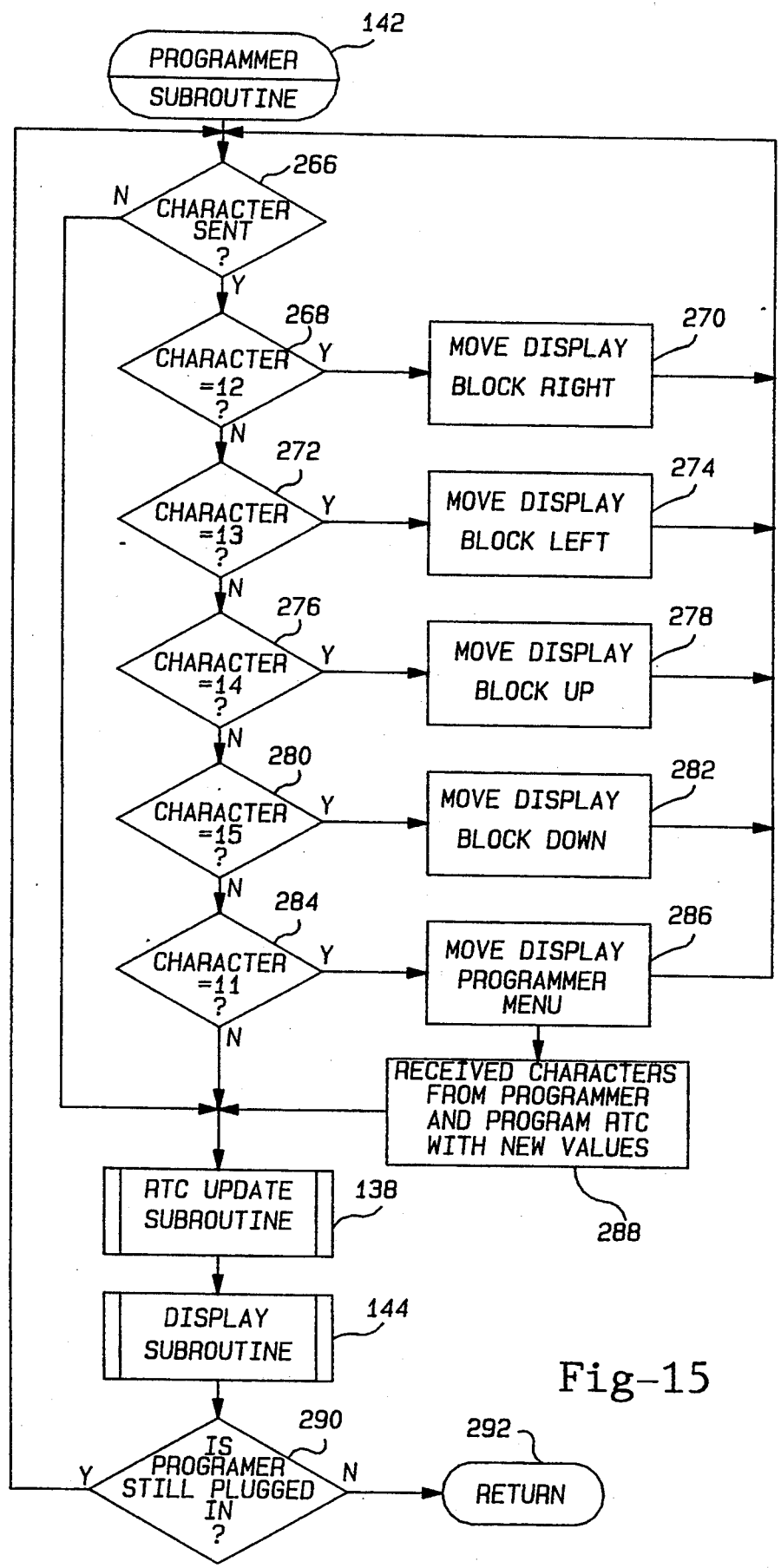
FIG. 15 is a flow diagram of the Programmer Subroutine.

The details of the Programmer Subroutine 142 are shown in FIG. 15. The Programmer Subroutine 142 begins by inquiring, decision block 266, if a character has been sent. If no character is sent, the microprocessor will proceed to the RTC Update Subroutine 138 is discussed relative to FIG. 3. Otherwise, if the Plug-in Programmer 38 has sent a character the microprocessor will inquire, decision block 268, if the character sent is a 12, which is an instruction to move the display block 22 to the right as indicated in block 270. If the character is 13, decision block 272, the microprocessor will move the display block 22 to the left, as indicated by block 274. Alternatively if the character is 14, decision block 276, the microprocessor will move the display block up, as indicated by block 278, or move the display block down, as indicated by block 282, when the character received is 15, as indicated by decision block 280.

However, if the received character is 11, block 284, the microprocessor will display the plug-in Programmer menu on the Monitor 14, as indicated by block 286, then proceed to program the Real Time Clock 36 with new values received from the Plug-in Programmer 38. The new values may include time, date, sheriff unit number or any other information to be displayed in the display block 22. The microprocessor will then execute the Real Time Clock (RTC) Update Subroutine 138 described relative to flow diagram shown in FIG. 13, then the Display Subroutine 144 described with reference to the flow diagram shown in FIG. 14.

After executing the Display Subroutine 144 the microprocessor will inquire if the Programmer 38 is still plugged in, decision block 290, and if it is the microprocessor will return to decision block 266 and repeat the Programmer Subroutine 142. Unplugging of the Programmer 38 will terminate the Programmer subroutine 142 and the microprocessor will return to the execution of the System Controller routine shown in FIG. 5.

A Record Inhibit Routine 294 is executed by the microprocessor in the System Controller 18 each time a RECORD or STOP code is generated by actuating the RECORD key or the STOP key on the Remote Control Unit 16. The Record Inhibit Routine 294 begins by inquiring, block 298, if a record inhibit switch is enabled. This switch is a test switch only used by the technician servicing the Video Incident Capture System. In operation of the Video Incident Capture System, the record inhibit switch is enabled. This switch is in the locked steel vault 40 and is not available to the operator of the vehicle. As previously indicated, the Record Inhibit Routine 294 prevents the operator of the vehicle from erasing a portion of the videotape by recording over a previously recorded portion. The microprocessor will then inquire, decision block 300, if the RECORD key has been activated. If the RECORD key has been activated, the microprocessor will set a "record requested" flag, as indicated by block 302, then proceed to inquire, decision block 304, if the low byte (LB) current position of the videotape, IPLCH, is greater than the low byte position on the videotape, RPLCH, where the proceeding or last recording was terminated. The current position of the videotape is monitored by the Tape Position Interrupt Routine to be discussed relative to FIG. 17. This routine monitors the pulse signals generated by the Video Recorder 12 for its tape position display and stores data indicative of the current position of the videotape. The position data TPLCH and RPLCH for accuracy consists of two bytes, a high byte (HB) and a low byte (LB). If the low byte tape position TPLCH is greater than the low byte tape position RPLCH, then the computer will load the VCR buffer with a rewind (REW) code, as indicated by block 306, then converts the rewind code to a JRS key code, as indicated by block 308, which activates the Video Recorder 12 to rewind the tape. The Record Inhibit Routine then returns to decision block 304 and keeps repeating until low byte TPLCH is equal to low byte RPLCH, at which point the answer to the inquiry of decision block 304 is NO. In the alternative, if the low byte tape position TPLCH is less than the low byte tape position RPLCH, decision block 310, the microprocessor will load the VCR buffer with a fast forward (F/F) code as indicated by decision block 314. Again, the F/F code in the VCR buffer is converted to a JSR key code, block 309, activating the Video Recorder 12 to fast forward the videotape. The Record Inhibit Routine 294 will then return to decision block 304, and the procedure will be repeated until the low byte of TPLCH is equal to the low byte of RPLCH. The same procedure is replicated with regard to the high bytes of TPLCH and PPLCH, as indicated by decision blocks 312 and 316, until the high byte of TPLCH is equal to the high byte of RPLCH. The procedure returns the videotape to the position where the prior recording was terminated. The microprocessor will then load the VCR buffer with a STOP code as indicated by block 318, then convert the STOP code to a JSR key code, block 319, stopping the fast forwarding or rewinding of the videotape as indicated by blocks 318 and 308 respectively. The microprocessor will then load the video buffer with the RECORD code activating the Video Recorder 12 to start recording. The Record Inhibit Routine is then terminated, as indicated by return block 324.

Returning to decision block 300, if a record is not requested, the microprocessor will inquire, decision block 326, if a STOP is requested. If not, the Record Inhibit Routine will proceed to the return block 324 and be terminated. If a STOP has been requested, decision block 326, the microprocessor will proceed to inquire, decision block 328, if the record flag has been set, indicating the Video Recorder is actively recording video information. If the record flag is set, the microprocessor will proceed to load the VCR buffer with a STOP code, as indicated by block 330. Otherwise, if the record flag is not set, the Record Interrupt Routine 294 will be terminated and return to the System Controller Routine 100 shown in FIG. 5.

After loading the VCR buffer with the STOP code, it is converted to a JSR key code 332, terminating the recording by the Video Recorder 12. The microprocessor will then copy the content of a register storing the low byte of TPLCH into a recording terminated low byte register storing the low byte portion of RPLCH, and the content of a register storing the high byte of TPLCH into a recording terminated high byte register storing the high byte portion of RPLCH as indicated by blocks 334 and 336, thereby storing the position of the videotape where the recording was stopped. The microprocessor will then clear the recording requested flag, as indicated by block 338, and terminate the Record Inhibit Routine 294 and return to the System Controller Routine 100 shown in FIG. 5.

Figure 17:
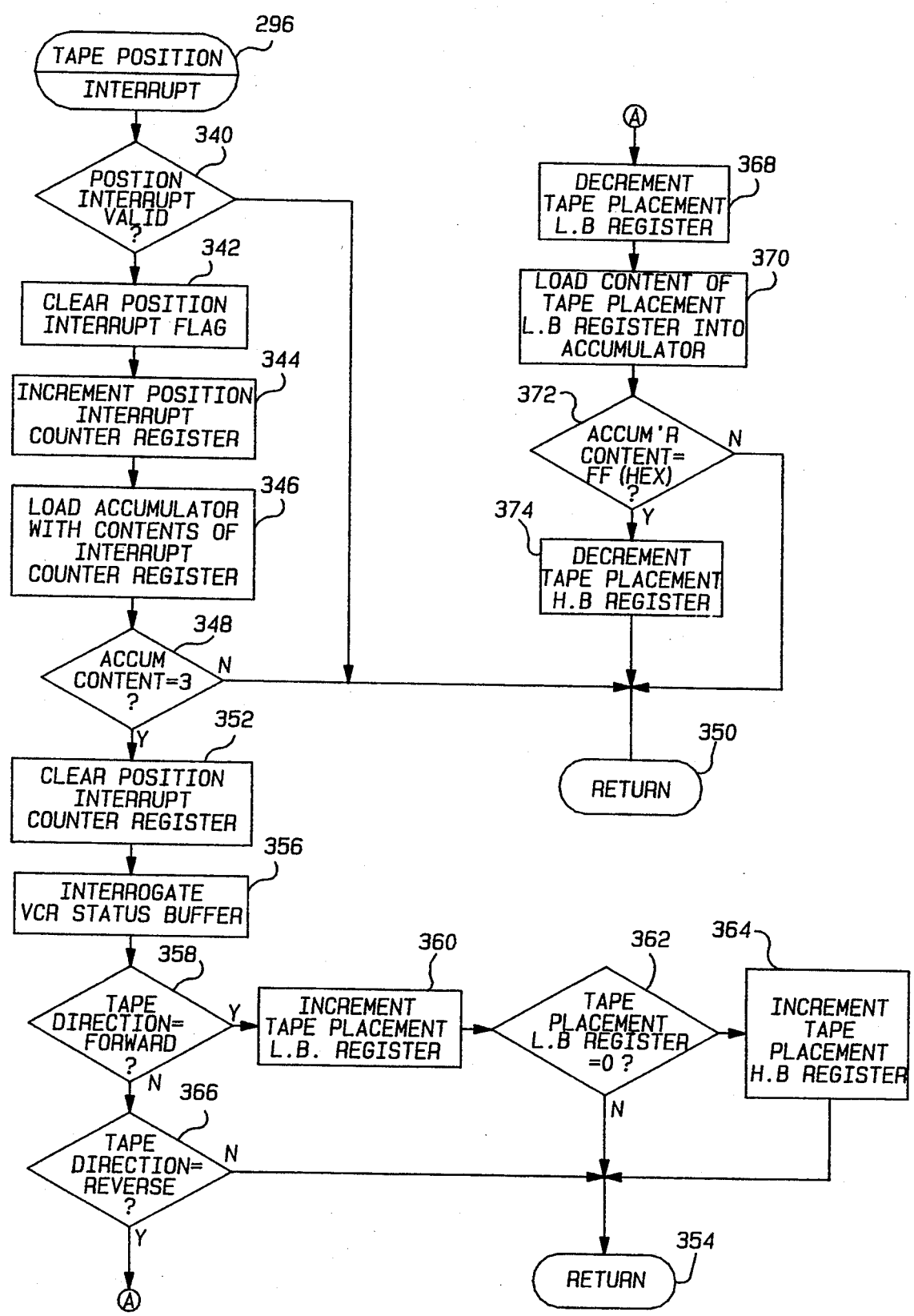
FIG. 17 is a flow diagram of the Tape Position Interrupt.
Figure 18:
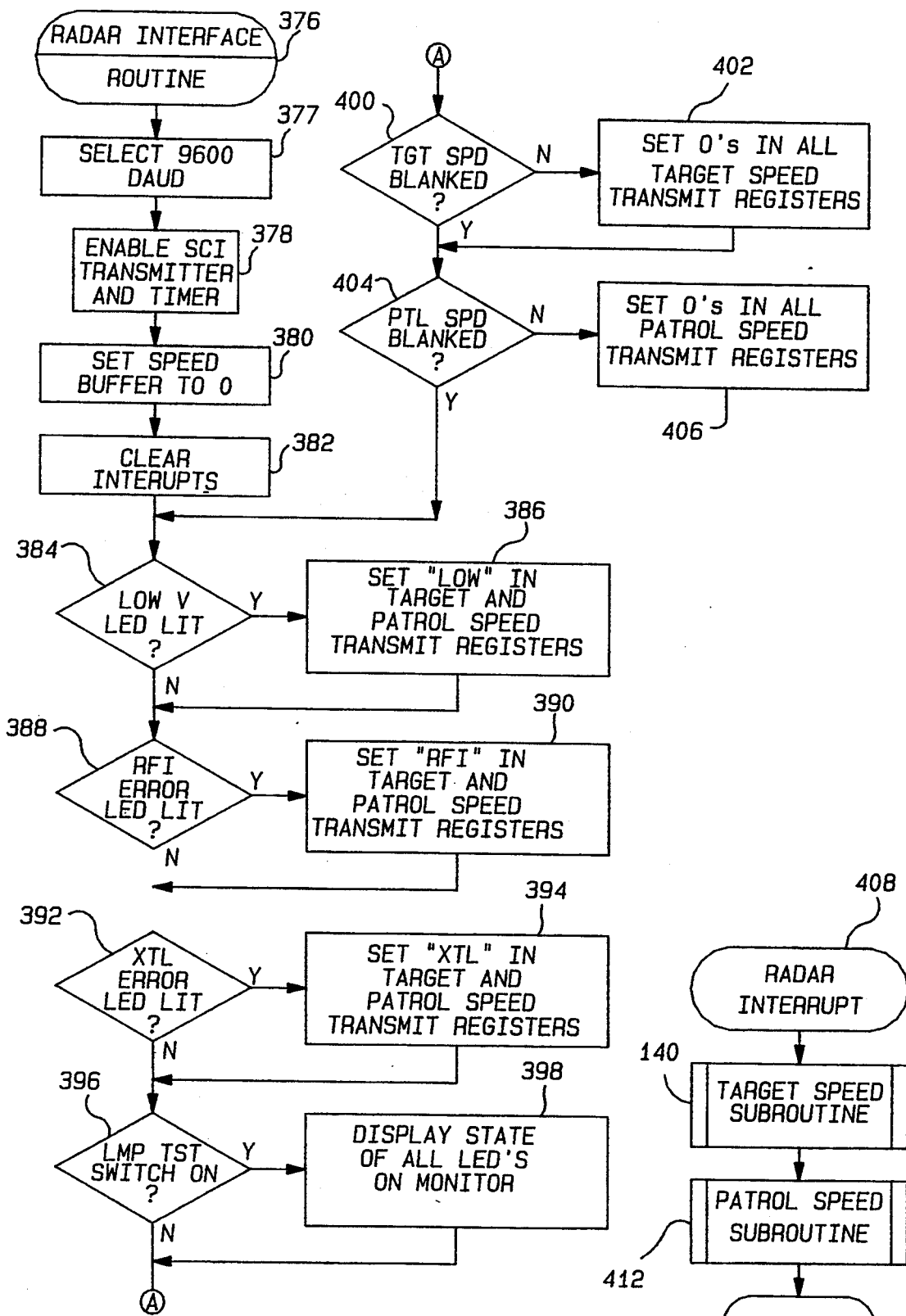
FIG. 18 is a flow diagram of the Radar Interface Routine.

The details of the Tape Position Interrupt 296 are shown in FIG. 17. The Video Recorder tape position display is incremented by every third tape position interrupt signal generated by the Video Recorder 12 when the tape is moving in a forward direction or reverse direction. The Tape Position Routine 296 will first inquire, decision block 340, if the position interrupt pulse received from the Video Recorder 12 was a valid position interrupt signal. If so, the microprocessor will then clear the position interrupt flag, then increment a position interrupt counter register as indicated by blocks 342 and 344 respectively. The microprocessor will then load an accumulator with the content of the position interrupt counter register, block 346, then inquire, decision block 348, if the content of the position interrupt counter register is 3 indicating the Video Recorder tape position display has been incremented one position. If not, the Tape Position Routine will be terminated, as indicated by return block 350, and await for the next position interrupt pulse. However, if the content of the accumulator indicates 3 position interrupt signals have been received, the microprocessor will clear the interrupt counter register and set the position interrupt flag, block 352.

The microprocessor will then interrogate the VCR status buffer, block 356, and inquire, decision block 358, if the tape is moving in a forward direction. If it is, the microprocessor will increment the low byte tape placement register TPLCH, block 360, then inquire, decision block 362, if the content of the low byte placement register is 0. If the content of the low byte placement register is 0, it means the content of the low byte tape placement register has rolled over, therefore the high byte tape placement register, TPLCH, must be incremented by 1 as indicated by block 364. Otherwise, if the content of low byte tape placement register is not 0, the Tape Position Routine is terminated, as indicated by return block 354. If the tape is moving in the reverse direction, decision block 366, the microprocessor will decrement the low byte tape placement register, TPLCH, then load its content into an accumulator, as indicated by blocks 368 and 370 respectively. The microprocessor will then inquire if the content of the accumulator is FF (HEX), as indicated by decision block 372. If the content of the accumulator is FF, it means the low byte tape placement register, TPLCH, has rolled over backwards from 0, therefore the high byte tape placement register TPLCH must be decremented by 1, as indicated by block 374. The Tape Position Routine 296 is terminated, return block 350, if either the content of the low byte tape placement register has not rolled over backwards, or the high byte tape placement register has been decremented. The Tape Position Routine 296 provides to the System Controller 18 the exact current location of the videotape so that System Controller 18 can ascertain if the videotape has to be wound or rewound to inhibit the possibility of recording over a previously recorded portion of the videotape, as discussed relative to the Record Inhibit Routine 294 shown in FIG. 16.

The operation of the Radar Interface 26 will be discussed relative to the flow diagram shown in FIGS. 18 through 23. The Radar Interface routine 376 shown in FIG. 18 begins by its microprocessor 92 selecting a 9600 baud rate, as indicated by block 377, which permits the Radar Interface 26 to communicate with the System Controller 18. The routine then enables the Serial Command Interface (SCI) transmitter and the timer, as indicated by block 378. The serial command interface and the timer are internal to the microprocessor 92. The microprocessor will set the buffer amplifier 82 through 90 to zero (0), as indicated by block 380, and clear all interrupts as indicated by block 382. The radar interface microprocessor 92 will then sequentially inquire if the Radar Unit's low voltage (LOW V) light emitting diode (LED) is lit, if the RFI error light emitting diode is lit and if the crystal (XTL) error light emitting diode is lit, as indicated by decision blocks 384, 385 and 392 respectively. If the low voltage error LED is lit, the radar interface microprocessor will set the letters L, O and W in the target and patrol speed 100's place, 10's place and 1's place transmit registers, which are specified locations in the microprocessor's random access memory. If the RFI error LED is lit, the microprocessor will set R, F and I in the 100's place, 10's place and 1's place target and patrol speed transmit registers respectively, as indicated by block 390. When the crystal error LED is lit, the microprocessor will place X, T, and L in the 100's place, 10's place and 1's place target and patrol speed transmit registers respectively, as indicated by block 394. The microprocessor will next interrogate a lamp test switch and will place the state of each LED in the 100's place, 10's place and 1's place transmit registers so that they can be displayed on the Monitor 14.

Finally, the microprocessor will inquire if the Radar Unit 24 is generating a target speed blank signal and a patrol speed blank signal, as indicated by decision blocks 400 and 404 respectively. These blanking signals are generated by the Radar Unit 24 in the absence of target and patrol speed data and set the content of the target and patrol display drives 72-80 to 0. The microprocessor, in response to the target and patrol blanking signal, will set the target and patrol 100's place, 10's place and 1's place transmit registers to 0 also.

Figure 19:
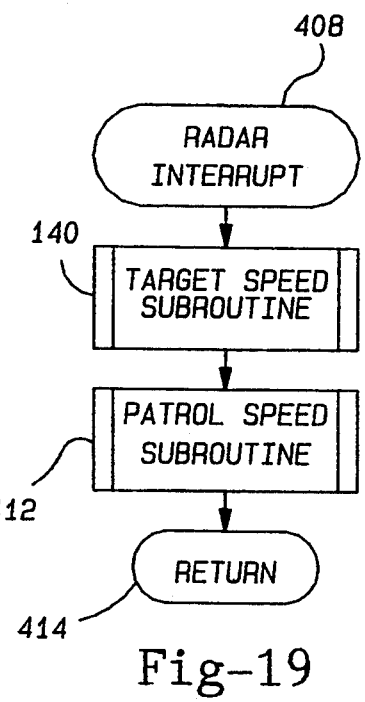
FIG. 19 is a flow diagram of the Radar Interface.

A Radar Interrupt 408, shown in FIG. 19, is executed when the Radar Unit generates a latch enable signal, latching target and patrol data in the display drives 72 through 80. The latch enable signal is also received at the interrupt (IRQ) input to the microprocessor as shown in FIG. 3. The Radar Interrupt 408 activates the microprocessor to sequentially execute the Target Speed Subroutine and the Patrol Speed Subroutines indicated by blocks 410 and 412 respectively, then returns to the Radar Routine 376, as indicated by return block 414.

Figures 20, 21:
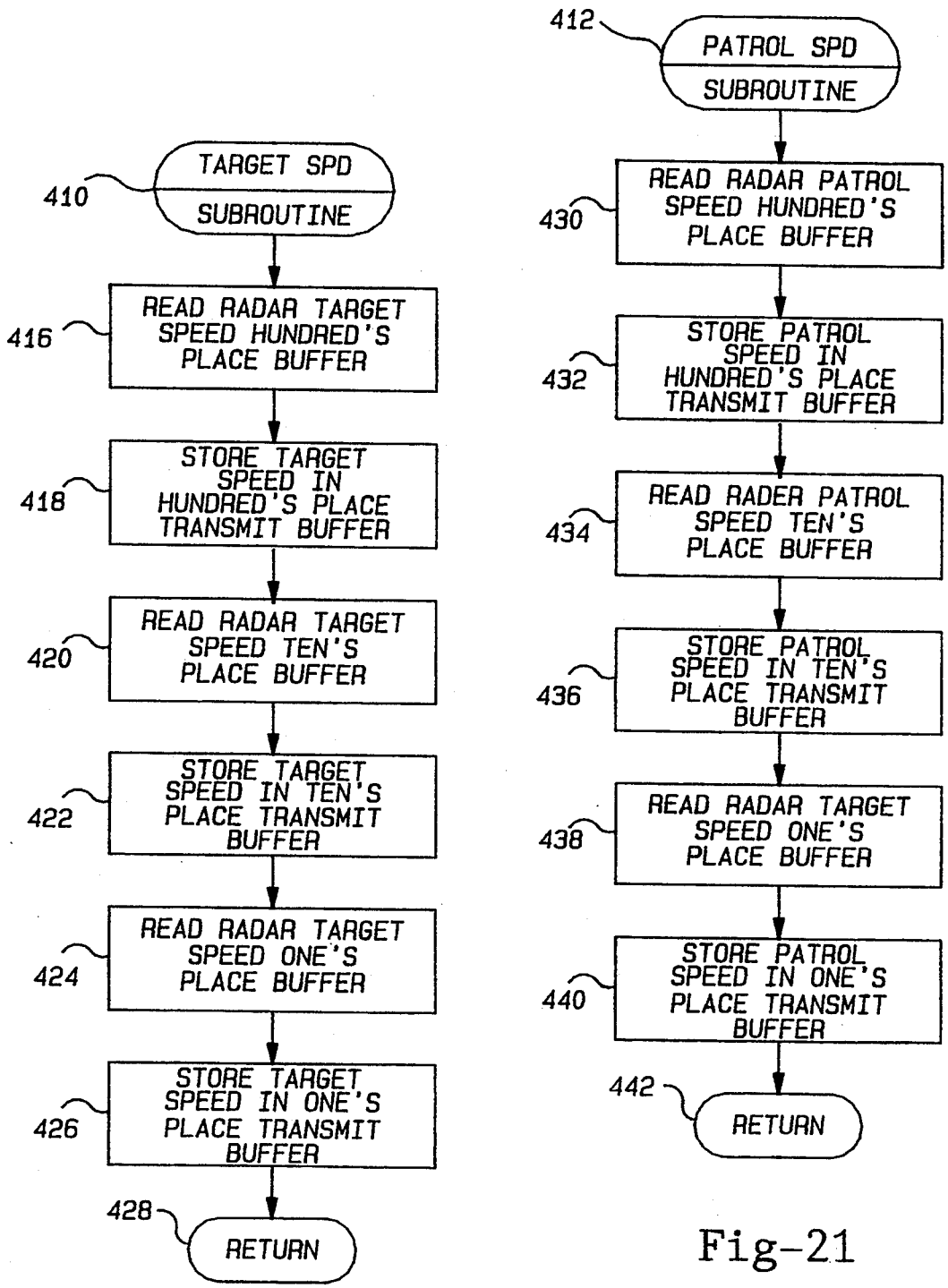
FIG. 20 is a flow diagram of the Target Speed Subroutine.
FIG. 21 is a flow diagram of the Patrol Speed Subroutine.

The details of the Target Speed Subroutine 410 are shown in FIG. 20. This subroutine sequentially reads the content of the target speed 100's place buffer amplifier 82 and stores it in target speed 100's place transmit buffer, as indicated by blocks 416 and 418 respectively. The Target Speed Subroutine 410 will then sequentially read the 10's place buffer amplifier 84 and the 1's place buffer amplifier and store their content in the 10's place transmit buffer and 1's place transmit buffer, as indicated by blocks 420 through 426, then return to the Radar Interrupt 408 as indicated by return block 428.

The Patrol Speed Subroutine 412 is identical in format to the Target Speed Subroutine 410. In the Patrol Speed Subroutine 412 the 100's place (when it exists), the 10's place and the 1's place patrol buffer amplifier are read and their content stored in the 100's place, 10's place and 1's place transmit buffer, as indicated by blocks 430 through 440. After transferring the content of the 100's place, 10's place, and 1's place buffer amplifier into the corresponding transmit buffers, the Patrol Speed Subroutine is terminated as indicated by return block 442.

The 100's place, 10's place and 1's place target and patrol speed transmit buffers are predetermined memory locations in the radar interface microprocessor's internal random access memory.

Figure 22:
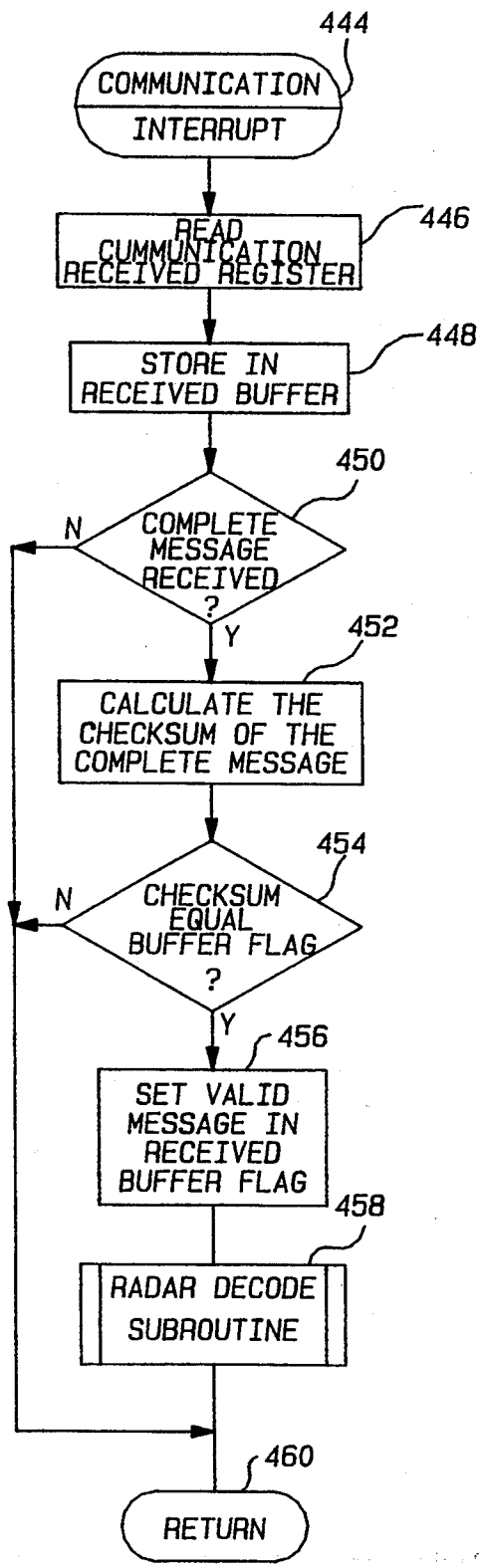
FIG. 22 is a flow diagram of a Communication Interrupt for the Radar Interface.

A Communication Interrupt 444 is generated each time a message is received by the Radar Interface 26. The details of the Communication Interrupt 444 are shown in FIG. 22. This interrupt begins by reading the content of a communication received register and storing it in a received buffer, as indicated by blocks 446 and 448 respectively. The radar interface microprocessor 92 will then inquire, decision block 450, if a complete message has been received. In particular, have all five bytes of the message been received? If a complete message has been received, the microprocessor will calculate the checksum of the complete message, block 452, then inquire, decision block 454, if the calculated checksum is equal to the checksum contained in the fifth byte of the received message. If the two checksums are equal, the microprocessor will set a "valid message in received buffer" flag, as indicated by block 456, then proceed to execute the Radar Decode Subroutine indicated by block 458. If the received message is not a complete message, or if the checksums are not the same, indicating a transmission error, or the Radar Decode Subroutine 458 is over, the Communication Interrupt is terminated, as indicated by the return block 460.

Figure 23:
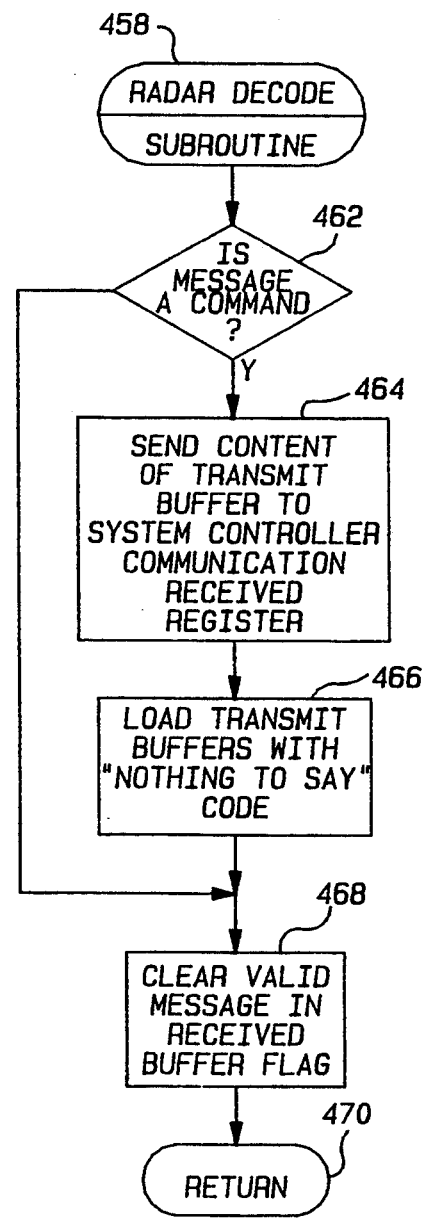
FIG. 23 is a flow diagram for a Radar Decode Subroutine.
Figure 24:
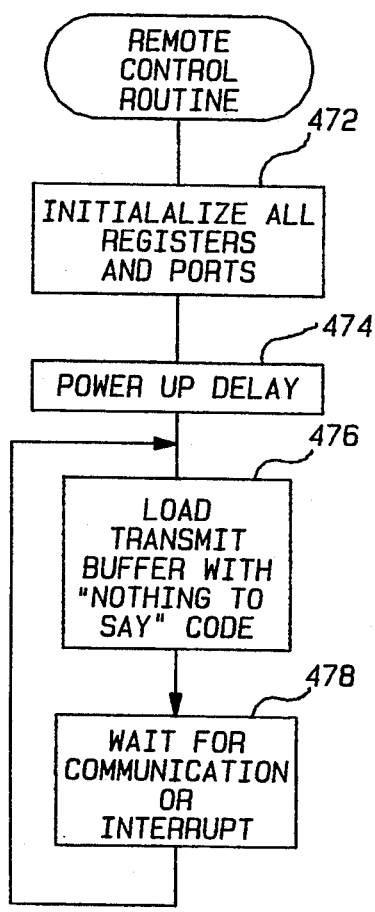
FIG. 24 is a flow diagram for a Remote Control Routine.

The details of the Radar Decode Subroutine 458 are shown in FIG. 23. The subroutine begins by inquiring, decision block 462, if the message is a command to transmit the target and patrol speed data to the System Controller 18. If the received message is a command, the microprocessor will then transmit the content of the 100's place, 10's place and 1's place, target and patrol speed transmit buffers to the System Controller 18, then load the target and patrol speed transmit buffers with a "nothing to say" code, as indicated by blocks 464 and 466 respectively.

If the message is not a command, decision block 462, or the target and patrol speed transmit buffers have been loaded with a "nothing to say" code, the Radar Decode Subroutine 458 will clear the "valid message in received buffer" flag, block 468, and return to the Communication Interrupt 444, FIG. 22, as indicated by return block 470.

The operation of the Remote Control Unit 16 shall be described relative to the flow diagrams shown in FIGS. 24 through 27. The Remote Control Routine 524 shown in FIG. 24 begins by initializing all registers and ports, followed by a power-up delay as indicated by blocks 472 and 474. The microprocessor will then load a transmit buffer with a "nothing to say" code, then wait for a communication or key interrupt as indicated by blocks 476 and 478 respectively. After each communication or key interrupt, the Remote Control Routine 524 will return to block 476 and load the transmit buffer with the "nothing to say" code.

Figure 25:
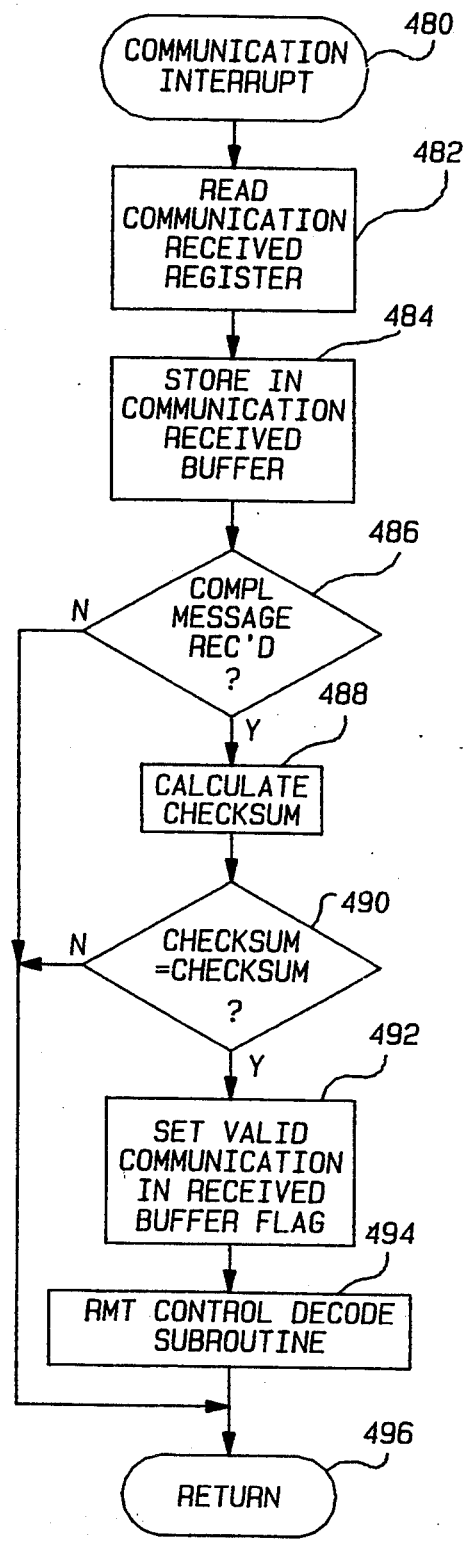
FIG. 25 is a flow diagram for a Communication Interrupt for the Remote Control.

The details of the Communication Interrupt 480 are shown in FIG. 25. This interrupt is initiated by the receipt of a message from the System Controller 18.

The Communication Interrupt begins by reading the received message from a communication received register and storing it in a communication received buffer, as indicated by blocks 482 and 484 respectively. The remote control microprocessor will then inquire, decision block 486, if a complete message, i.e. five bytes, has been received. If all five bytes of the message have been received, the remote control microprocessor will calculate the checksum of the received message, block 488, then compare it with the checksum contained in byte 5 of the message to determine if they are equal, decision block 490. If the checksums are equal, the remote control microprocessor will set a "valid communication in received buffer" flag, block 492, then proceed to execute the Remote Control (RMT CNTRL) Decode Subroutine 494. If a complete message is not received, decision block 486, or the calculated checksum is different from the checksum contained in the message or when the microprocessor completes the execution of the Remote Control Decode Subroutine 494, the Communication Interrupt will terminate as indicated by return block 496 and the microprocessor will return to the Remote Control Routine 524.

Figure 26:
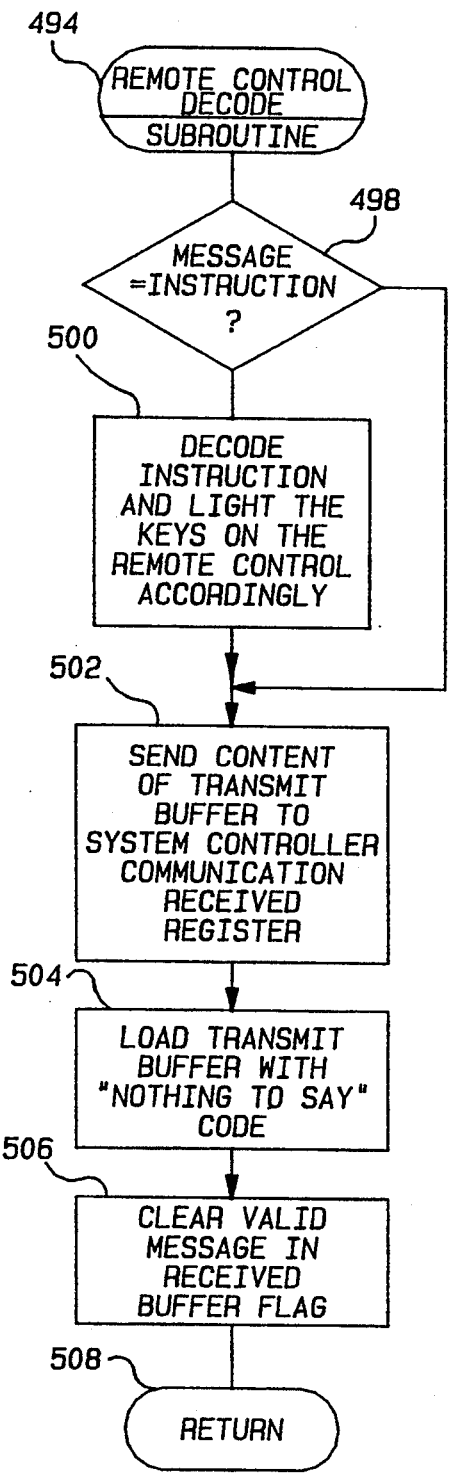
FIG. 26 is a flow diagram for a Remote Control Decode Subroutine.
Figure 27:
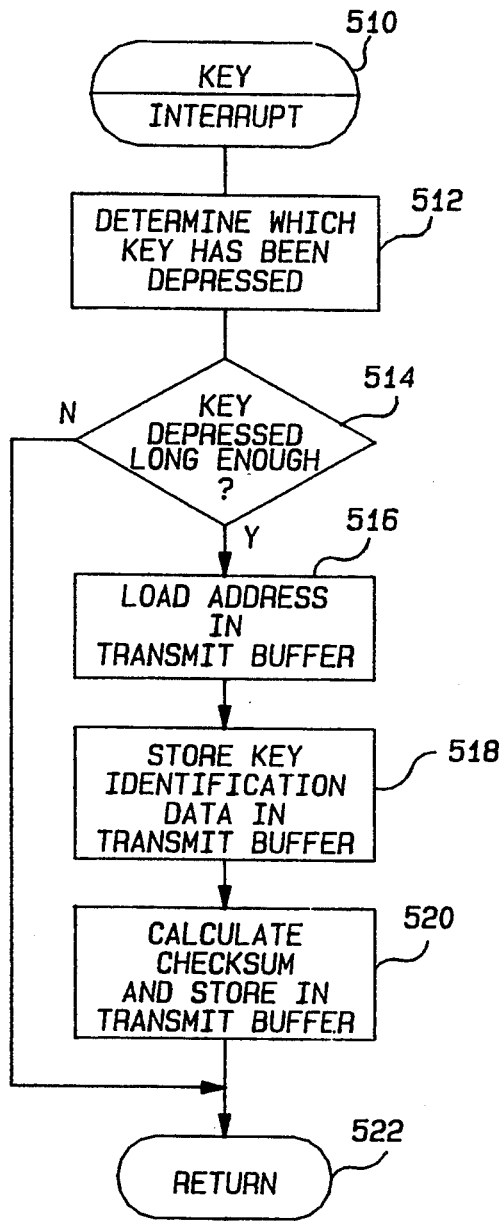
FIG. 27 is a flow diagram of the Key Interrupt.

The details of the Remote Control Decode Subroutine 494 will be discussed relative to FIG. 26. This subroutine begins by inquiring, decision block 498, if the message is an instruction. If it is, the remote control microprocessor will decode the instruction and light the appropriate keys on the Remote Control Unit 16. If the message is a command rather than an instruction, decision block 498, the remote control microprocessor will transmit the content of its transmit buffer to the System Controller 18, as indicated by block 502. The remote control microprocessor will then load the transmit buffers with a "nothing to say" code, block 504, and clear the "valid message in received buffer" flag, block 506.

After lighting the keys in response to an instruction or clearing the "valid message in received buffer" flag, the Remote Control Decode Subroutine 494 will terminate, as indicated by return block 508, and the microprocessor will return to the Communication Interrupt.

The Remote Control Unit 16 will generate a Key Interrupt 510 every time one of the keys is actuated. The microprocessor will first determine which key has been depressed, block 512, then inquire if the key had been depressed long enough, as indicated by decision block 514. Normally, the key is to be depressed for a predetermined number of clock pulses generated by the microprocessor to be assured that the key was intentionally depressed, differentiating the received signal from noise or an accidental momentary depression of the key. If the key was depressed long enough, the address of where the key data is to be stored in the System Controller 18 is loaded into the transmit buffer, block 516, then the key identification data is loaded into the transmit buffer, block 518. The command control microprocessor will then calculate a checksum and store it as the fifth byte of the transmit register, as indicated by block 520. The Key Interrupt 510 will terminate after the checksum is stored in the transmit buffer, block 520, or the key was not depressed long enough, decision block 514, as indicated by return block 522. After loading the required data and checksum in the transmit buffer, the microprocessor will return to the Remote Control Routine and wait for a Communication Interrupt 480.

In its preferred embodiment, the Video Incident Capture System is powered by a back-up battery when the voltage of the vehicle's battery is below the voltage requirements of the system. This provides for continuous operation of the system when the ignition switch of the law enforcement vehicle is turned off, and provides continuous electrical power to the System Controller to sustain the operation of the real time clock and to prevent the erasure of data contained in the random access memory of the System Controller microprocessor.

Having described the Video Incident Capture System and how it operates, it is not intended that the Video Incident Capture System be limited to the embodiment shown in the drawings and described in the Specification. It is well known that those skilled in the art may modify or make changes to the disclosed Video Incident Capture System within the spirit of the invention as described herein and set forth in the Claims.

What is claimed is:

1. A video incident capture system for a law enforcement vehicle comprising:
   a video camera for generating video signals of an incident, said video camera mounted inside said law enforcement vehicle and positioned to photograph said incident through a window of said law enforcement vehicle:
   a video recorder having means for recording said video signals on a video tape, means for rewinding said video tape, means for fast-forwarding said video tape, and means for playing back said video tape to reproduce the video signals recorded thereon;
   a monitor means selectively responsive to said video signals generated by said video camera and said video signals reproduced by said vehicle recorder from said video tape to generate a visual picture;
   a portable wireless microphone worn by an operator of said law enforcement vehicle, said wireless microphone generating a radio signal modulated by received audio communications;
   a receiver means for generating electrical signals corresponding to said audio communications received from said microphone in response to said radio signals;
   a means for inhibiting said video recorder from recording over a previously recorded portion of said video tape including a means for storing an actual position in said video recorder, a means for storing a recording terminated tape position corresponding to said actual position of said video tape at a termination of a proceeding recording, a means for indexing said video tape to said recording terminated tape position prior to initiating a subsequent recording to said video tape in response to a record code being generated by an actuation of a record key on a remote control being stored on a VCR buffer;
   said video recorder has a tape position display storing a numeral indication of the actual position of said video tape, a means for generating a pulse signal to increment and decrement said tape position display in response to a predetermined displacement of said video tape, said means for storing an actual tape position comprises an actual tape position register incremented in response to said video recorder actuated by one of a record, playback or fast-forward codes and a pulse signal generated by said video recorder and for decrementing an actuated tape position registered in response to said video recorder being actuated by a rewind code and said pulse signals; and
   said means for storing said recording terminated tape position comprises means responsive to a stop code being generated to terminate a recording by said video recorder to load a terminated position register with a content of said actual tape position register.

2. The system of claim 1 wherein said means for indexing said videotape comprises means for comparing the content of said actual tape position register with the content of said terminated position register, in response to said record code, to load said rewind code into said VCR buffer when the content of said actual tape position register is greater than the content of said terminated position register and to load said fast-forward code in said VCR buffer when the content of said actual tape position register is less than the content of said terminated position register, means for loading said stop code into said VCR buffer when the content of said actual tape position register is equal to the content of said terminated position register and means responsive to the loading of said stop code in said VCR buffer to load said VCR buffer with said record code to initiate the recording of said video signals on said videotape starting at a position wherein the previous recording was terminated.

3. A video incident capture system for a law enforcement vehicle comprising:
   a video camera for generating video signals of an incident, said video camera mounted inside said law enforcement vehicle and positioned to photograph said incident through a window of said law enforcement vehicle;
   a video recorder having means for recording said video signals on a videotape, means for rewinding said videotape, means for fastforwarding said videotape, and means for playing back said video tape to reproduce the video signals recorded thereon;
   a monitor means selectively responsive to said video signals generated by said video camera and said video signals reproduced by said video recorder from said videotape to generate a visual picture;
   a portable wireless microphone worn by an operator of said law enforcement vehicle, said wireless microphone generating a radio signal modulated by received audio communications;
   a receiver means for generating electrical signals corresponding to said audio communication received by said wireless microphone in response to said radio signals; and
   a tone generator means for superimposing a continuous tone signal over said electrical signals generated by said receiver means to assist in detecting tampering of said recording.

* * * * *